United States Patent
Kimura

(10) Patent No.: US 7,606,136 B2
(45) Date of Patent: Oct. 20, 2009

(54) OBJECT LENS FOR OPTICAL PICKUP DEVICE, OPTICAL PICKUP DEVICE AND OPTICAL INFORMATION RECORDING/REPRODUCING DEVICE

(75) Inventor: Tohru Kimura, Hachioji (JP)

(73) Assignee: Konica Minolta Holdings, Inc. (JP)

( * ) Notice: Subject to any disclaimer, the term of this patent is extended or adjusted under 35 U.S.C. 154(b) by 782 days.

(21) Appl. No.: 10/525,660

(22) PCT Filed: Aug. 28, 2003

(86) PCT No.: PCT/JP03/10994
§ 371 (c)(1),
(2), (4) Date: Feb. 25, 2005

(87) PCT Pub. No.: WO2004/021065
PCT Pub. Date: Mar. 11, 2004

(65) Prior Publication Data
US 2005/0254399 A1    Nov. 17, 2005

(30) Foreign Application Priority Data
Aug. 28, 2002 (JP) .............................. 2002-248207
Dec. 27, 2002 (JP) .............................. 2002-379657
Feb. 20, 2003 (JP) .............................. 2003-042269

(51) Int. Cl.
*G11B 7/00* (2006.01)
(52) U.S. Cl. .............................. 369/112.23; 369/112.05
(58) Field of Classification Search ........................ None
See application file for complete search history.

(56) References Cited
U.S. PATENT DOCUMENTS 6,349,083 B1 *   2/2002   Kiriki et al. ............. 369/112.23

2001/0008512 A1 *   7/2001   Maruyama ............. 369/112.08
2003/0021039 A1 *   1/2003   Saito .......................... 359/719

FOREIGN PATENT DOCUMENTS

JP              9-311271            12/1997

(Continued)

OTHER PUBLICATIONS

International Search Report (PCT/JP03/010994).

*Primary Examiner*—Joseph H Feild
*Assistant Examiner*—Christopher R. Lamb
(74) *Attorney, Agent, or Firm*—Finnegan, Henderson, Farabow, Garrett & Dunner, L.L.P.

(57) ABSTRACT

An objective lens used for an optical pickup device wherein the optical pickup device includes: light source; and a converging optical system including the objective lens for converging a light beam emitted from the light source to an information recording surface of an optical information recording medium, and the optical pickup device is capable of recording and/or reproducing information by converging the light beam emitted from the light source to the information recording surface of the optical information recording medium with the converging optical system, the objective lens being a plastic single lens and satisfying following formulas when NA is an image-side numerical aperture required for recording and/or reproducing information to the optical information recording medium and f (mm) is a focal length of the objective lens. Even in a plastic single lens having a high NA, thermal aberration does not increase excessively, and in a plastic single lens of a refraction type, thermal aberration within the temperature range of practical use in an optical pickup device is suppressed within an allowable range $$NA \geq 0.8 \quad (1)$$
$$1.0 > f > 0.2 \quad (2).$$

52 Claims, 6 Drawing Sheets

FOREIGN PATENT DOCUMENTS

| | | |
|---|---|---|
| JP | 11-337818 | 12/1999 |
| JP | 2000-35535 | 2/2000 |
| JP | 2001-51192 | 2/2001 |
| JP | 2001-143301 | 5/2001 |
| JP | 2001-283459 | 10/2001 |
| JP | 2001-296471 | 10/2001 |
| JP | 2001-324673 | 11/2001 |
| JP | 2002-82280 | 3/2002 |
| JP | 2002-156579 | 5/2002 |
| JP | 2002-197712 | 7/2002 |
| JP | 2002-236253 | 8/2002 |
| JP | 2003-85806 | 3/2003 |
| JP | 2003-114383 | 4/2003 |
| JP | 2003-167188 | 6/2003 |
| JP | 2003-167189 | 6/2003 |
| JP | 2003-167191 | 6/2003 |
| JP | 2003-167192 | 6/2003 |

* cited by examiner (A)

(B)

OBJECT LENS FOR OPTICAL PICKUP DEVICE, OPTICAL PICKUP DEVICE AND OPTICAL INFORMATION RECORDING/REPRODUCING DEVICE

TECHNICAL FIELD

The present invention relates to an optical pickup device, an optical information recording/reproducing apparatus and an objective lens used for them, and particularly, relates to an optical pickup device, an optical information recording/reproducing apparatus which are capable of high density optical information recording or reproducing, and an objective lens used for them.

BACKGROUND ART

Hitherto, a plastic single lens has been generally used as an objective lens used in an optical pickup device or optical information recording/reproducing apparatus for recording or reproducing an optical information recording medium such as a CD, MD and DVD.

Because of lower specific density than a glass lens, a plastic lens has an advantage that it is possible to reduce the burden of an actuator driving the objective lens for focusing and tracking, and to perform tracking of the objective lens in this regard at high speed.

Also, a plastic lens produced by injection molding in a mold can be mass-produced by manufacturing a desired mold with high accuracy. Thereby, although it is made possible to exert high performance of the lens stably, it is made possible to plan to reduce the cost.

By the way, in recent years, study/development of new high-density optical disk system in which a blue-violet laser diode light source having a wavelength of approximately 400 nm and an objective lens having a numerical aperture (NA) enhanced up to approximately 0.85 are used has been progressed. By way of example, as for an optical disk performing information recording/reproducing with descriptions of an NA of 0.85 and a light source wavelength of 405 nm (hereinafter, such an optical disk is referred to as "high-density DVD"), it is possible to record information of 20 to 30 GB per side on an optical disk having a diameter of 12 cm that is the same size as a DVD (an NA of 0.6, a light source wavelength of 650 nm and a storage capacity of 4.7 GB).

Here, in an optical pickup device for such a high-density DVD, spherical aberration generated by refractive index change accompanying temperature change (hereinafter, such spherical aberration is referred to as "thermal aberration") becomes a problem in case that an objective lens having a high NA is a plastic lens. Such a problem occurs owing to a plastic lens two orders of magnitude larger than a glass lens in terms of change of the refractive index. Usable temperature range becomes very narrow in case that the objective lens having an NA of 0.85 used for a high-density DVD is a plastic lens because the thermal aberration is proportional to 4th power of the NA, and accordingly it becomes a problem in practical use.

In JP Tokukaihei-11-337818A, an art of correcting such thermal aberration of a plastic single lens by using the diffraction effect of a ring-shaped phase structure formed on its optical surface is described.

For correcting thermal aberration of a plastic lens having an NA of 0.85 by this art, it is necessary to set a tilt of a spherical aberration curve in change of wavelength (hereinafter, such tilt of a spherical aberration curve is referred to as "chromatic spherical aberration") large. Therefore, it is impossible to use a laser diode having an emission wavelength that deviates from a standard wavelength by a manufacturing error, and selection of laser diodes becomes necessary, which causes a high cost.

A specific example with numerical values is shown below. An objective lens whose lens data is shown in Table 1 is a plastic single lens having an incident light beam diameter of 3 mm, a focal length of 2.5 mm, an NA of 0.6, a design wavelength of 650 nm and a design temperature of 25° C., and corrects thermal aberration by the diffraction effect of a ring-shaped phase structure formed on the first surface (optical surface of a light source example). On the other hand, an objective lens whose lens data is shown in Table 2 is a plastic single lens having an incident light beam diameter of 3 mm, a focal length of 1.76 mm, an NA of 0.85, a design wavelength of 405 nm and a design temperature of 25° C., and corrects thermal aberration by the diffraction effect of a ring-shaped phase structure formed on the first surface in the same way as the objective lens of Table 1. Note that a power-of-ten number (e.g. $2.5 \times 10^{-3}$) is expressed by using E (e.g. 2.5×E−3) hereinafter (including lens data in Tables).

TABLE 1

| Surface No. | r(mm) | d(mm) | N650 | νd | Remarks |
|---|---|---|---|---|---|
| 0 | | ∞ | | | Light source |
| 1 | 1.6603 | 2.0500 | 1.54090 | 56.7 | Objective |
| 2 | −4.5237 | 1.0105 | | | lens |
| 3 | ∞ | 0.6000 | 1.57756 | 30.0 | Protective |
| 4 | ∞ | | | | layer |

Aspherical surface coefficients

| | 1st surface | 2nd surface |
|---|---|---|
| κ | −6.8755E−01 | −7.9005E+00 |
| A4 | 3.0995E−03 | 4.3885E−02 |
| A6 | 2.6042E−04 | −3.2001E−02 |
| A8 | 4.5653E−05 | 1.1954E−02 |
| A10 | −1.2223E−04 | −1.9590E−03 |

Diffraction surface coefficients

| | 1st surface |
|---|---|
| b2 | −2.3969E−03 |
| b4 | −7.8946E−04 |

TABLE 2

| Surface No. | r(mm) | d(mm) | N405 | νd | Remarks |
|---|---|---|---|---|---|
| 0 | | ∞ | | | Light source |
| 1 | 1.2099 | 2.4500 | 1.56013 | 56.7 | Objective |
| 2 | −1.5783 | 0.3771 | | | lens |
| 3 | ∞ | 0.1000 | 1.61950 | 30.0 | Protective |
| 4 | ∞ | | | | layer |

Aspherical surface coefficients

| | 1st surface | 2nd surface |
|---|---|---|
| κ | −7.1214E−01 | −4.3724E+01 |
| A4 | 5.4718E−03 | 5.2395E−01 |
| A6 | 5.1672E−03 | −1.1813E+00 |
| A8 | 1.5578E−03 | 1.2111E+00 |
| A10 | 1.0499E−03 | −5.0156E−01 |
| A12 | −7.7777E−04 | 6.2662E−04 |
| A14 | −1.4455E−05 | |
| A16 | 1.7285E−04 | |
| A18 | −2.2142E−05 | |
| A20 | −1.2407E−05 | |

TABLE 2-continued

| Diffraction surface coefficients | |
|---|---|
| | 1st surface |
| b2 | −7.6944E−03 |
| b4 | −8.9900E−03 |
| b6 | 1.1465E−03 |
| b8 | 2.2677E−04 |
| b10 | −3.3067E−04 |

An aspherical surface in such an objective lens is expressed by the following Formula 1 when the optical axis direction is x-axis, the height of the direction perpendicular to the optical axis is h and the curvature radius of the optical surface is r. Note that κ is a constant of the cone and $A_{2i}$ is an aspherical surface coefficient.

$$X = \frac{h^2/r}{1 + \sqrt{1 - (1+\kappa)h^2/r^2}} + \sum_{i=2} A_{2i}h^{2i} \quad \text{Formula 1}$$

Additionally, in such an objective lens, the ring-shaped phase structure as a diffractive structure formed on the optical surface is expressed by an optical path difference added to a transmitted wave front by the diffractive structure. As for the optical path difference is expressed by the optical path difference function $\Phi_b$ (mm) defined by the following Formula 2, when the height of the direction perpendicular to the optical axis is h and $b_{2i}$ are the diffractive surface coefficients (also referred to as optical path difference function coefficients).

$$\Phi_b = \sum_{i=1} b_{2i}h^{2i} \quad \text{Formula 2}$$

When a diffraction structure is formed on the optical surface of an objective lens based on a value of the optical path difference function $\Phi_b$ (mm), a ring surface is formed each time a value of the optical path difference function $\Phi_b$ (mm) is changed by n-times a predetermined wavelength λB (n is only a natural number). In the present description, "the diffraction structure is optimized at a wavelength $\lambda_B$ and a diffraction order n" indicates that a diffraction structure is determined in this way, and the wavelength is referred to as an optimized wavelength or production wavelength.

Table 3 shows RMS values of thermal aberration when an ambient temperature of the two objective lens has risen by 30° C., and RMS values of chromatic spherical aberration when incident wavelength becomes 5 nm longer than the design wavelength.

TABLE 3

| | Thermal aberration (+30° C.) | Chromatic spherical aberration(+5 nm) |
|---|---|---|
| NA 0.6 | 0.010 λrms | 0.003 λrms |
| NA 0.85 | 0.014 λrms | 0.057 λrms |

As found from Table 3, as for an objective lens having an NA of 0.6 has a chromatic spherical aberration suppressed at 0.003 λrms even when the thermal aberration is corrected to 0.010 λrms, and accordingly a laser diode having a wavelength deviating by 5 nm may be used. At the same time, as for an objective lens having an NA of 0.85, the chromatic spherical aberration becomes 0.057 λrms when the thermal aberration is corrected to 0.014 λrms as much as the objective lens having an NA of 0.6, and accordingly a laser diode having a wavelength deviating by 5 nm cannot be used. Laser diodes used as a light source in an optical pickup device have variation of about ±5 nm in its emission wavelength, and accordingly, selection of laser diodes becomes necessary and the production cost of the optical pickup device rises in case of the objective lens having an NA of 0.85.

Note that, in the objective lenses of Tables 1 and 2, both of the change rates of the refractive indexes accompanying the temperature rise are made −9.0×10⁻⁵ and the change rates of the wavelength of incident light accompanying the temperature rise are respectively made +0.2 nm/° C. and +0.05 nm/° C.

Also, in the lens data of Table 1, r (mm) denotes a curvature radius, d (mm) denotes a surface distance, N650 denotes a refractive index at a wavelength of 650 nm and vd denotes an Abbe number at the d-line, and in the lens data of Table 2, r (mm) denotes a curvature radius, d (mm) denotes a surface distance, N405 denotes a refractive index at a wavelength of 405 nm and vd denotes an Abbe number at the d-line.

Furthermore, longitudinal chromatic aberration generated in an objective lens becomes a problem in case of using a blue-violet laser diode generating light with a short wavelength of about 400 nm as a light source like such an optical pickup device for a high-density DVD. In an optical pickup device, chromatic aberration of the objective lens is considered not to be a problem because laser light emitted from a laser diode has a single wavelength (single mode). However, actually a phenomenon referred to as mode hopping that a center wavelength is instantly changed by several nm owing to temperature change, output change or the like, is caused. Because the mode hopping is a wavelength change caused instantly which a focusing mechanism cannot track, there is caused a problem that a defocus component corresponding to movement of the image formation position is added and the converging ability of the objective lens is degraded when longitudinal chromatic aberration of the objective lens is corrected.

Because dispersion of general lens materials used for an objective lens is not so large within a range of 600 nm to 800 nm, which is the wavelength region of infrared laser diodes and red laser diodes, the degradation of the converging ability of an objective lens due to mod hopping did not become a problem in CDs and DVDs.

However, because dispersion of lens materials becomes very large in the region of 400 nm, which is the wavelength region of blue-velvet laser diodes, a wavelength change of even slightly several nm causes the image formation position of the objective lens deviate largely. Therefore in a high-density DVD, the converging ability of an objective lens is degraded largely and stable recording and reproducing might be impossible when a laser diode light source causes mode hopping.

The present invention, which has been made in consideration of circumstances as described above, aims at providing a plastic single lens that is applicable as an objective lens of an optical pickup device using an objective lens having a high NA and has an available temperature range being sufficiently wide and slight degradation of converging ability owing to mode hopping of a light source.

Furthermore, the present invention aims at providing a plastic single lens that is applicable as an objective lens of an optical pickup device using an objective lens having a high NA, wherein it is possible to make selection of laser diode light source unnecessary in the production step of an optical pickup device without excessive increase of chromatic spherical aberration even when thermal aberration has been corrected in order to extend the available temperature range.

Furthermore, the present invention aims at providing an optical pickup device where a plastic single lens of these is mounted, and an optical information recording/reproducing apparatus where the optical pickup device is mounted.

DISCLOSURE OF INVENTION

An objective lens for an optical pickup device of the first embodiment is an objective lens used for an optical pickup device, wherein the optical pickup device comprises: a light source; and a converging optical system including the objective lens for converging a light beam emitted from the light source to an information recording surface of an optical information recording medium, and the optical pickup device is capable of recording and/or reproducing information by converging the light beam emitted from the light source to the information recording surface of the optical information recording medium with the converging optical system, and wherein the objective lens is a plastic single lens and satisfies following formulas:

$$NA \geq 0.8 \tag{1}$$

$$1.0 > f > 0.2 \tag{2}$$

where NA is an image-side numerical aperture of the objective lens, which is required for recording and/or reproducing information to the optical information recording medium and f (mm) is a focal length of the objective lens.

The variation of spherical aberration owing to change of the refractive index of the plastic single lens accompanying temperature rise (thermal aberration) increases in proportion to the focal length and 4th power of the NA. Accordingly, even in cases of increasing the NA for densifying an optical information recording medium, it is made possible to comparatively suppress the thermal aberration by reducing the focal length according thereto. Therefore, as for the objective lens of the first embodiment, by setting the upper limit of the focal length as the formula (2), thermal aberration is prevented from increasing excessively even in case of a plastic single lens having a high NA that satisfies the formula (1). Furthermore, as for a plastic single lens of a refraction type, it is impossible to make thermal aberration zero completely. However, it is possible to suppress the thermal aberration in a temperature range of practical use of the optical pickup device into an allowable range by making the focal length not excess the upper limit of the formula (2).

On the other hand, though reduction of the focal length is advantageous from the viewpoint of suppressing the generation amount of thermal aberration, excessive reduction of the focal length is disadvantageous from the viewpoint of the working distance and image height characteristics. As for design of an objective lens having a high NA, securing the focal length is a very important problem for preventing clash with an optical information recording medium. When the focal length is reduced excessively, the working distance is lost by that amount, which is not favorable. When trying to obtain the same image height as an objective lens having a relatively long focal length, astigmatic aberration and coma aberration are degraded because an incident angle to an objective lens having a relatively short focal length increases. Accordingly, it is not favorable to reduce the focal length of the objective lens also from the viewpoint of image height characteristics. Therefore, the objective lens of of the first embodiment secured the necessary and sufficient working distance and image height characteristics by setting the upper limit of the focal length as the formula (2).

An objective lens for the optical pickup device of consistent with the first embodiment is characterized in that when $W(\lambda_0, T_0)$ is an RMS value of residual aberration of the objective lens a first ambient temperature $T_0=25°$ C. and $W(\lambda_0, T_1)$ is an RMS value of residual aberration of the objective lens when light having the wavelength of $\lambda_0$ (nm) which is a design wavelength thereof is incident to the objective lens at the environmental temperature which is a second ambient temperature $T_1=55°$ C., $\Delta W$ defined by $$\Delta W = |W(\lambda_0, T_1) - W(\lambda_0, T_0)| \tag{3}$$

satisfies a following formula:

$$\Delta W < 0.035 \ \lambda \text{rms} \tag{4}$$

For making a plastic single lens capable of be used within the temperature range of practical use in an optical pickup device, it is preferable to give temperature characteristics that make the focal length not excess the upper limit of the formula (2) and consequently satisfies the formula (4). Thereby, it is possible to perform good recording/reproducing of information for an optical information recording medium by using the plastic single lens within the temperature range of practical use in an optical pickup device.

An objective lens for the optical pickup device according to the present invention is characterized in that, in the objective lens for the optical pickup device of the first embodiment, the design wavelength $\lambda_0$ of the optical objective lens is not more than 500 nm, and in case that $fB(\lambda_0, T_0)$ is an back focal length of the objective lens when light having a wavelength of $\lambda_0$ (nm) is incident to the objective lens at an environmental temperature which is a first ambient temperature $T_0=25°$ C. and $fB(\lambda_1, T_0)$ is a back focal length of the objective lens when light having a wavelength of $\lambda_1$ (nm) which is 5 nm longer than the wavelength of $\lambda_0$ is incident to the objective lens in the environmental temperature which is the first ambient temperature $T_0=25°$ C., $\Delta fB$ defined by $$\Delta fB = |fB(\lambda_1, T_0) - fB(\lambda_0, T_0)| \tag{5}$$

satisfies a following formula:

$$\Delta fB < 0.001 \text{ mm} \tag{6}$$

The longitudinal chromatic aberration due to mode hopping of a laser diode increases in proportion to the focal length. Accordingly, even in case of using, for example, a blue-violet laser diode as the light source, it becomes possible to suppress the longitudinal chromatic aberration comparatively when the focal length is reduced corresponding thereto. As for a single lens of a refraction type, it is impossible to make chromatic aberration zero completely. However, it is possible to suppress the variation of wavefront aberration including a defocus component less than 0.035 λrms for the variation of wavelength due to mode hopping of the blue-violet laser diode when variation of the back focal length in increasing the incident wavelength by 5 nm is made less than 0.001 mm (the formula (6)) in an object lens, in which the focal length is set so as to satisfy the formula (2) and a blue-violet laser diode is used as a light source. Therefore, conversing ability is not degraded significantly even when mode hopping is caused in switching from the reproducing condition to the recording condition.

An objective lens for the optical pickup device further consistent with the first embodiment is characterized in that the objective lens is an objective lens of a finite conjugate type for converging a diverging light beam emitted from the light source to the information recording surface of the optical information recording medium and satisfies a following formula:

$$0.8 > f > 0.2 \quad (6A)$$

The objective lens is preferable as an objective lens for an optical pickup device of which miniaturization is required, and for example, may be used as an objective lens for an optical pickup device installed in a portable optical disk player. In order to obtain an objective lens of a finite conjugate type having an image formation magnification of m and brightness as much as an objective lens of an infinity type, it is necessary to design a lens having brightness (1−m) times as much as the image-side numerical aperture of the objective lens of an infinity type. The sign of m becomes minus and the substantial image-side numerical aperture becomes larger than the image-side numerical aperture of the objective lens of an infinity type in case that the objective lens is a finite conjugate type that converges a diverging light beam emitted from the light source on the information recording surface of the optical information recording medium. Accordingly, the thermal aberration is made large than the objective lens of the infinity type when the objective lens of the finite conjugate type is made a plastic single lens. In the objective lens consistent with the first embodiment, by making the upper limit of the focal length further less than the formula (2) and setting it as the formula (6A), it is possible to suppress thermal aberration in an allowable range of practical use even in case of a plastic single lens of a finite conjugate type having a high NA as the NA satisfies the formula (1). In the objective lens of the finite conjugate type for converging a diverging light beam, the working distance becomes larger as compared to the objective lens of the infinity type having the same focal length. Accordingly, it is not disadvantageous from the viewpoint of securing the working distance also in case of making the upper limit of the focal length further less than the formula (2) as the objective lens according to the first embodiment.

An objective lens for an optical pickup device further consistent with the first embodiment is characterized in that m satisfies following formula when m is an image formation magnification of the objective lens:

$$0.2 > |m| > 0.02 \quad (6B)$$

When the image formation magnification m is larger than the lower limit of the above-described formula (6B), even an objective lens having short focal length which satisfies the above-described formula (6A) can secure a sufficient working distance. On the other hand, when the image formation magnification m is smaller than the upper limit of the formula (6B), it is possible to suppress the thermal aberration within the allowable range of practical use because the substantial image-side numerical aperture does not increase excessively.

An objective lens used for an optical pickup device of the second embodiment is an objective lens used for an optical pickup device, wherein the optical pickup device comprises a light source; and a converging optical system including an objective lens for converging a light beam emitted from the light source to an information recording surface of an optical information recording medium, and the optical pickup device is capable of recording and/or reproducing information by converging the light beam emitted from the light source to the information recording surface of the optical information recording medium with the converging optical system, wherein the objective lens is a plastic single lens that comprises a ring-shaped phase structure on at least one optical surface, the ring-shaped phase structure comprising a plurality of ring surfaces and formed so that adjacent ring surfaces generate a predetermined optical path difference for incident light, and satisfies following formulas:

$$NA \geq 0.8 \quad (7)$$

$$1.3 > f > 0.2 \quad (8)$$

where NA is an image-side numerical aperture of the objective lens, which is required for recording and/or reproducing information for the optical information recording medium and f (mm) is a focal length of the objective lens.

In the plastic objective lens in which the numerical aperture NA satisfies the formula (7), in case of correcting spherical aberration (thermal aberration) that is generated by the refractive index change accompanying temperature rise by an effect of the ring-shaped phase structure formed on the optical surface thereof, the tilt (chromatic spherical aberration) of the spherical aberration curve in change of the wavelength becomes excessively large. Accordingly, it is impossible to use a laser diode having an emission wavelength that deviates from a standard wavelength by a manufacturing error, and selection of laser diodes becomes necessary.

As described above, the variation of spherical aberration owing to change of the refractive index of the plastic objective lens increases in proportion to the focal length and 4th power of an NA. Accordingly, even in cases of the NA increasing for densifying an optical information recording medium, it is made possible to comparatively suppress the spherical aberration owing to the refractive index change of the objective lens by reducing the focal length according thereto.

As for the objective lens of the second embodiment, it is possible to prevent chromatic spherical aberration after correcting thermal aberration from excessively increasing, because the correction amount of thermal aberration due to the effect of the ring-shaped phase structure is suppress low by setting the upper limit of the focal length as the formula (8). As a result of this, as for an optical pickup device in which the objective lens due to the present invention is mounted, it is possible to suppress the production cost because selection of laser diodes in the production step. Meanwhile, though reduction of the focal length is advantageous from the viewpoint of suppressing the generation amount of thermal aberration, excessive reduction of the focal length is disadvantageous from the viewpoint of the working distance and image height characteristics. Therefore, the objective lens of the present invention secured the necessary and sufficient working distance and image height characteristics by setting the upper limit of the focal length as the formula (8).

In the present description, an objective lens indicates, in the narrow sense, a lens having the converging ability which is disposed at the position closest to the optical information recording medium to face opposite it in a state that an optical recording medium is loaded in the optical pickup device, and in the broad sense, a lens capable of being actuated with the lens at least in the optical axis direction by an actuator. Accordingly, in the present description, a numerical aperture of the objective lens on the optical information recording medium side (image side) indicates the numerical aperture of the lens surface of the objective lens located closest to the optical information recording medium. Also in the present description, a necessary (predetermined) numerical aperture indicates a numerical aperture regulated by the standard of respective optical information recording media or a numerical aperture of an objective lens having the diffraction limit ability capable of obtaining a spot size required for recording or reproducing information depending on the wavelength of a used light source for respective optical information recording media.

Also in the present description, recording of information indicates recording information on an information recording surface of an optical information recording medium like the above. In the present description, reproducing of information indicates reproducing information recorded on an information recording surface of an optical information recording medium like the above. An objective lens of the present invention may be used for only recording or only reproducing, and may be used for both of recording and reproducing. It may be used for recording for a certain optical information recording medium and reproducing for another optical information recording medium, or may be used for recording or reproducing for a certain optical information recording medium and recording and reproducing for another optical information recording medium. The term reproducing here includes reading information simply.

As for an objective lens for the optical pickup device consistent with the second embodiment, the ring-shaped phase structure is a diffraction structure having a function for diffracting predetermined incident light and the objective lens forms a converging wave front which is converged on the information recording surface owing to an effect obtained by combining a diffraction effect and a refraction effect, and the above-described operation is exerted effectively and thereby it is preferable.

An objective lens for the optical pickup device further consistent with the second embodiment has spherical aberration characteristics that spherical aberration changes in an undercorrected direction when a wavelength of the incident light changes to a longer wavelength.

Because a plastic single lens has a refractive index reduced by temperature rise generally, spherical aberration changes in the overcorrected direction. Meanwhile, the emission wavelength of a laser diode generally has a tendency to change in the increase direction by temperature rise. Accordingly, by providing the objective lens having the above-described spherical aberration characteristics owing to the effect of the diffraction structure, change of spherical aberration that is made overcorrection by change of the refractive index accompanying temperature rise can be counterbalanced by change of spherical aberration that is made undercorrection by change of the emission wavelength of a laser diode due to temperature rise. As for even a high-NA plastic single lens, because the objective lens of the present invention has a focal length satisfying the formula (8), the correction amount of thermal aberration owing to the effect of the diffraction structure is small and chromatic spherical aberration after correcting the thermal aberration does not become large excessively.

In the present description, an optical surface (diffraction surface) on which a diffraction structure is formed is a surface given an effect for diffracting an incident light beam by providing relief for surface of an optical element, e.g. a surface of a lens, and in case that there are a region for generating diffraction and a region for not generating diffraction on the same optical surface, the region for generating diffraction. A diffraction structure or a diffraction pattern is the region for generating diffraction. As the shape of the relief, for example, a shape is formed on the optical element as substantially concentric ring surfaces centered on the optical axis, and when its section of the plane including the optical axis is seen, a serrate or stepwise shape is known as for respective ring surfaces, while these shapes are included.

Furthermore, innumerable diffracted lights of 0th-order diffracted light, ±1st-order diffracted lights, ±2nd-order diffracted lights . . . are generated from the optical surface (diffraction surface) on which a diffraction structure is formed. For example, in case of a diffraction surface having relief whose meridional section is serrate as above, the shape of the relief may be set such that the diffraction efficiency of a particular order is made higher than diffraction efficiencies of the other orders, and in some cases, the diffraction efficiency of one particular order (e.g. +1st-order diffracted light) is made almost 100%. In the present invention, "a diffraction structure is optimized at a wavelength of $\lambda_B$ and a diffraction order of n" indicates setting the shape of the diffraction structure (relief) such that the diffraction efficiency of diffracted light of a diffraction order of n becomes 100% theoretically when light having a wavelength of $\lambda_B$ is made incident.

An objective lens for the optical pickup device further consistent with the second embodiment is characterized in that when an optical path difference added to a wave front transmitted through the diffraction structure is denoted by an optical path difference function $\phi_b$ defined by $$\phi_b = b_2 \cdot h^2 + b_4 \cdot h^4 + b_6 \cdot h^6 + \ldots$$

(wherein $b_2$, $b_4$, $b_6$ . . . are 2nd-order, 4th-order, 6th-order . . . optical path difference function coefficients, respectively), a following formula is satisfied:

$$-70 < (b_4 \cdot h_{MAX}^4)/(f \cdot \lambda_0 \cdot 10^{-6} \cdot (NA \cdot (1-m))^4) < -20 \tag{8A}$$

wherein $\lambda_0$ (nm) is a design wavelength of the objective lens, $h_{MAX}$ is an effective diameter maximum height (mm) of the optical surface on which the diffraction structure is formed and m is an image formation magnification of the objective lens.

The objective lens for the optical pickup device of the present invention is preferably designed such that the 4th-order optical path difference function coefficient $b_4$, the effective diameter maximum height $h_{MAX}$ of the optical surface on which the diffraction structure is formed, the image formation magnification m, the focal length f and the image-side numerical aperture NA satisfy the condition of the above-described formula (8A). This condition is a condition for improving the balance of the correction of thermal aberration and the generation amount of chromatic spherical aberration in a plastic lens where a diffraction structure is formed. In case of exceeding the lower limit of the above formula, the generation amount of chromatic spherical aberration does not increase excessively because thermal aberration is not overcorrected, and accordingly it is possible to use even a laser diode having an emission wavelength that deviates from a standard wavelength by a manufacturing error, and it is possible to ease the selection condition of laser diodes to plan reduction of the costs. Meanwhile, in case of falling below the upper limit of the above formula, it is possible to provide a broad temperature range in which a plastic lens having a high NA can be used, because spherical aberration generated by the refractive index change of the plastic lens having a high NA can be counterbalanced by spherical aberration generated by wavelength change of the laser diode.

As for an objective lens for the optical pickup device further consistent with the second embodiment, the ring-shaped phase structure generates the predetermined optical path difference for the incident light by forming the adjacent ring surfaces so as to be displaced in an optical axis direction each other, and the objective lens forms a converging wave front which is converged on the information recording surface owing to a refraction effect, and the above-described operation is exerted effectively and thereby it is preferable.

An objective lens for the optical pickup device according to another variation of the second embodiment, comprises at least one ring surface formed to be displaced to the inside compared with a ring surface adjacent to the side closer to the optical axis and at least one ring surface formed to be displaced to the outside compared with a ring surface adjacent to the side closer to the optical axis, and the ring surface formed to be displaced to the inside compared with a ring surface adjacent to the side closer to the optical axis is formed closer to the optical axis than the ring surface formed to be displaced to the outside compared with a ring surface adjacent to the side closer to the optical axis, and thermal aberration can be well corrected by configuring the ring-shaped phase structure in this way and thereby it is preferable.

An objective lens for the optical pickup device consistent with the second embodiment is characterized in that a total of the ring surfaces is from 3 to 20.

An objective lens for the optical pickup device according to another variation of the second embodiment is characterized in that when $\Delta_j$ (μm) is a step amount of an arbitrary step of steps in the optical axis direction at a boundary of mutually adjacent ring surfaces in a ring-shaped phase structure formed in a region from a height of 75% to a height of 100% of an effective diameter maximum height of the optical surface on which the ring-shaped phase structure is formed and n is a refractive index of the objective lens at a design wavelength of $\lambda_0$ (nm), $m_j$ represented by $$m_j = INT(X) \quad (8B)$$

(wherein $X = \Delta_j \cdot (n-1)/(\lambda_0 \cdot 10^{-3})$ and INT(X) is an integer obtained by half adjust of X) is an integer not less than 2.

In the objective lens according to the second embodiment, a total of the ring surfaces is from 3 to 20, and additionally, when $\Delta_j$ (μm) is a step amount of an arbitrary step of steps in the optical axis direction at a boundary of mutually adjacent ring surfaces in a ring-shaped phase structure formed in a region from a height of 75% to a height of 100% of an effective diameter maximum height of the optical surface on which the ring-shaped phase structure is formed and n is a refractive index of the objective lens at a design wavelength of $\lambda_0$ (nm), $m_j$ represented by the above-described (8B) is an integer not less than 2, and mold process for molding an objective lens becomes easy and time spent for the mold process can be reduced because it is possible to secure a large width of a ring surface in the direction perpendicular to the optical axis.

Here, in case of the ring-shaped phase structure formed on the 1st surface (the optical surface on the light source side), "formed to be displaced to the inside compared with a ring surface adjacent to the side closer to the optical axis" indicates "formed to be displaced in the direction of the 2nd surface (the optical surface of the optical information recording medium side) compared with a ring surface adjacent to the side closer to the optical axis", and formed to be displaced to the outside compared with a ring surface adjacent to the side closer to the optical axis" indicates "formed to be displaced in the direction opposite to the direction of the 2nd surface (the optical surface of the optical information recording medium side) compared with a ring surface adjacent to the side closer to the optical axis". Also, in case of the ring-shaped phase structure formed on the 2nd surface (the optical surface on the optical information recording medium side), "formed to be displaced to the inside compared with a ring surface adjacent to the side closer to the optical axis" indicates "formed to be displaced in the direction of the 1st surface (the optical surface of the light source side) compared with a ring surface adjacent to the side closer to the optical axis", and formed to be displaced to the outside compared with a ring surface adjacent to the side closer to the optical axis" indicates "formed to be displaced in the direction opposite to the direction of the 1st surface (the optical surface of the light source side) compared with a ring surface adjacent to the side closer to the optical axis".

An objective lens for the optical pickup device consistent with a further variation of the second embodiment is characterized in that when $W(\lambda_0, T_0)$ is an RMS value of residual aberration of the objective lens when light having a wavelength of $\lambda_0$ (nm) which is a design wavelength thereof is incident to the objective lens at an environmental temperature which is a first ambient temperature $T_0=25°$ C., $W(\lambda_1, T_0)$ is an RMS value of residual aberration of the objective lens when light having a wavelength of $\lambda_1$ (nm) which is 5 nm longer than the wavelength of $\lambda_0$ is incident to the objective lens at the environmental temperature which is the first ambient temperature $T_0=25°$ C. and $W(\lambda_2, T_1)$ is an RMS value of residual aberration of the objective lens when light having a wavelength of $\lambda_2$ (nm) is incident to the objective lens at the environmental temperature which is a second ambient temperature $T_1=55°$ C., $\Delta W1$ and $\Delta W2$ defined by $$\Delta W1 = |W(\lambda_2, T_1) - W(\lambda_0, T_0)| \quad (9)$$

$$\Delta W2 = |W(\lambda 1, T_0) - W(\lambda_0, T_0)| \quad (10)$$

satisfy following formulas:

$$\Delta W1 < 0.035 \; \lambda rms \quad (11)$$

$$\Delta W2 < 0.035 \; \lambda rms \quad (12)$$

wherein when $\lambda_0 < 600$ nm, $\lambda_2 = \lambda_0 + 1.5$ (nm) and
when $\lambda_0 \geq 600$ nm, $\lambda_2 = \lambda_0 + 6$ (nm).

In a plastic lens having a high NA, when thermal aberration is completely corrected by the effect of the ring-shaped phase structure formed on the optical surface, chromatic spherical aberration increases excessively even in case that the focal length satisfies the formula (8) and it might be impossible to use a laser diode having an emission wavelength that deviates from a standard wavelength, and accordingly it is necessary to balance the correction of thermal aberration and the generation amount of chromatic spherical aberration in lens design. Here, the formula (9) is a formula corresponding to thermal aberration in case of temperature rising by 30° C., and the formula (10) is a formula corresponding to chromatic spherical aberration in case of the wavelength of incident light changing by 5 nm. As for the objective lens of the present invention, it is preferable that thermal aberration, chromatic spherical aberration and total aberration of the chromatic spherical aberration and the thermal aberration satisfy the formulas (11) and (12) and the after-described formula (13).

The condition that when $\lambda_0 < 600$ nm, $\lambda_2 = \lambda_0 + 1.5$ (nm) corresponds the change (+0.05 nm/° C.) of the emission wavelength owing to temperature rise of a blue-violet laser diode, and the condition that when $\lambda_0 \geq 600$ nm, $\lambda_2 = \lambda_0 + 6$ (nm) corresponds the change (+0.2 nm/° C.) of the emission wavelength owing to temperature rise of a red laser diode.

In the present description, a design wavelength of an objective lens is the wavelength making residual aberration of the objective lens the minimum in cases of making lights of various wavelength incident to the objective lens on the same condition (the image formation magnification, temperature, incident light beam diameter and the like). Furthermore, in the present description, a design temperature of an objective lens is the temperature making residual aberration of the objective lens the minimum in cases of measuring the residual aberration of the objective lens in various environmental temperatures on the same condition (the image formation magnification, wavelength, incident light beam diameter and the like).

An objective lens for the optical pickup device according to a further variation of the second embodiment is characterized in that the objective lens satisfies the following formula.

$$\sqrt{((\Delta W1)^2+(\Delta W2)^2} < 0.05 \, \lambda \text{rms} \tag{13}$$

An objective lens for the optical pickup device in accordance with another variation of the second embodiment is characterized in that the objective lens is an objective lens of a finite conjugate type for converging a diverging light beam emitted from the light source on the information recording surface and satisfies a following formula:

$$1.1 > f > 0.2 \tag{13A}$$

The operation and effect of this invention is the same as the operation and effect consistent with the first embodiment.

An objective lens for the optical pickup device according to a further variation of the second embodiment is characterized in that the objective lens satisfies a following formula when m is an image formation magnification of the objective lens:

$$0.2 > |m| > 0.02 \tag{13B}$$

The operation and effect of this invention is the same as the operation and effect consistent with the first embodiment.

An objective lens for the optical pickup device further in accordance with the second embodiment is characterized in that the objective lens satisfies a following formula:

$$0.8 < d/f < 1.8 \tag{14}$$

where d (mm) is a lens thickness in an optical axis of the objective lens and f (mm) is a focal length.

The formula (14) is a condition for securing good image height characteristics, sufficient production tolerance and sufficient working distance in a high NA objective lens having a small diameter in which the focal length satisfies the formulas (2), (6A), (8) and (13A), and there is an advantage that the 3rd-order astigmatic aberration component in evaluating image height characteristics by wavefront aberration does not increase excessively and higher-order coma aberration components equal to or more than 5th-order does not increase excessively when a value of d/f is larger than the lower limit of the formula (14). Meanwhile, there is an advantage that the 3rd-order spherical aberration component, 5th-order astigmatic aberration component, 3rd-order coma aberration component and astigmatic difference in evaluating image height characteristics by wavefront aberration do not increase excessively. Furthermore, because the gear radius of the optical surface on the light source side do not decrease excessively, it is possible to suppress generation of coma aberration due to optical axis deviation of optical surfaces and to secure sufficient production tolerance. When a value of d/f is larger than the lower limit of the formula (14), it is possible to suppress generation of birefringence owing to molding because the edge thickness is secured sufficiently and the uneven thickness ratio does not become excessively small, and meanwhile, when a value of d/f is less than the upper limit of the formula (14), the lens can be made light and driven by a smaller actuator and the working distance can be secured sufficiently because the lens thickness does not increase excessively.

As for an objective lens for the optical pickup device according to a variation of the second embodiment, the design wavelength of $\lambda_0$ (nm) of the objective lens satisfies a following formula, and it is possible to use it for an optical pickup device equipped with a short-wavelength light source such as a blue-violet laser diode.

$$500 \geq \lambda_0 \geq 350 \tag{15}$$

An objective lens for the optical pickup device further consistent with the second embodiment is characterized in that the objective lens satisfies a following formula:

$$0.40 \leq (X1-X2) \cdot (N-1)/(NA \cdot f \sqrt{(1+|m|)}) \leq 0.63 \tag{16}$$

where

X1: a distance (mm) in an optical axis direction between a plane that is perpendicular to an optical axis and tangent to a top of an optical surface on a light source side and an optical surface on the light source side in a most peripheral portion of an effective diameter (position of the NA on a surface on the light source side to which a marginal light beam is incident), wherein X1 is plus in a case of measuring X1 in a direction of the optical information recording medium with reference to the tangent plane, and minus in a case of measuring X1 in a direction of the light source, X2: a distance (mm) in an optical axis direction between a plane that is perpendicular to an optical axis and tangent to a top of an optical surface on an optical information recording medium side and an optical surface on the optical information recording medium side in a most peripheral portion of an effective diameter (position of the NA on a surface on the optical information recording medium side to which a marginal light beam is incident), wherein X2 is plus in a case of measuring X2 in a direction of the optical information recording medium with reference to the tangent plane and minus in a case of measuring X2 in a direction of the light source, N: a refractive index of the objective lens at the design wavelength of $\lambda_0$, f: a focal length (mm) of the objective lens, and m: an image formation magnification of the objective lens.

The objective lens for the optical pickup device regulates a conditional formula related to the sags of the optical surface on the light source side and the optical surface on the optical information recording medium side for well correcting spherical aberration. As X1 defined as described above is plus and its absolute value is smaller, or as X2 defined as described above is minus and its absolute value is smaller, the effect for overcorrecting the spherical aberration of the marginal light beam becomes higher, and as X1 defined as described above is plus and its absolute value is larger, or as X2 defined as described above is minus and its absolute value is larger, the effect for undercorrecting the spherical aberration of the marginal light beam becomes higher, and accordingly it is necessary that (X1−X2) is within a certain range in order to correct the spherical aberration. From the foregoing, it is preferable to satisfy the formula (16), and the marginal light beam is not overcorrected excessively when more than the lower limit and the marginal light beam is not undercorrected excessively when less than the upper limit. In particular, in case of an objective lens of an infinity type in which the image formation magnification at the design wavelength $\lambda_0$ is zero, it is more preferable to satisfy the following formula:

$$0.40 \leq (X1-X2) \cdot (N-1)/(NA \cdot f \sqrt{(1+|m|)}) \leq 0.55 \tag{16'}$$

and furthermore, in case of an objective lens of a finite conjugate type which converge a diverging light beam emitted from a light source on the information recording surface, it is more preferable to satisfy the following formula:

$$0.40 \leq (X1-X2) \cdot (N-1)/(NA \cdot f \cdot \sqrt{(1+|m|)}) \leq 0.63 \quad (16'')$$

An optical pickup device according to a third embodiment comprises: a light source; and a converging optical system including an objective lens for converging a light beam emitted from the light source to an information recording surface of an optical information recording medium, and is capable of recording and/or reproducing information by converging the light beam emitted from the light source to the information recording surface of the optical information recording medium with the converging optical system, wherein the objective lens is a plastic single lens and satisfies following formulas:

$$NA \geq 0.8 \quad (1)$$

$$1.0 > f > 0.2 \quad (2)$$

where NA is an image-side numerical aperture of the objective lens, which is required for recording and/or reproducing information to the optical information recording medium and f (mm) is a focal length of the objective lens.

The operation and effect of this invention is the same as the operation and effect of the first embodiment.

An optical pickup device consistent with the third embodiment is characterized in that when $W(\lambda_0, T_0)$ is an RMS value of residual aberration of the objective lens when light having a wavelength of $\lambda_0$ (nm) which is a design wavelength thereof is incident to the objective lens at an environmental temperature which is a first ambient temperature $T_0 = 25°$ C. and $W(\lambda_0, T_1)$ is an RMS value of residual aberration of the objective lens when light having the wavelength of $\lambda_0$ (nm) which is a design wavelength thereof is incident to the objective lens at the environmental temperature which is a second ambient temperature $T_1 = 55°$ C., $\Delta W$ defined by $$\Delta W = |W(\lambda_0, T_1) - W(\lambda_0, T_0)| \quad (3)$$

satisfies a following formula:

$$\Delta W < 0.035 \; \lambda rms \quad (4)$$

The operation and effect of this invention is the same as the operation and effect consistent with the first embodiment.

An optical pickup device according to a variation of the third embodiment is characterized in that the design wavelength $\lambda_0$ of the optical objective lens is not more than 500 nm, and in case that $fB(\lambda_0, T_0)$ is a back focal length of the objective lens when light having a wavelength of $\lambda_0$ (nm) is incident to the objective lens at an environmental temperature which is a first ambient temperature $T_0 = 25°$ C. and $fB(\lambda_1, T_0)$ is a back focal length of the objective lens when light having a wavelength of $\lambda_1$ (nm) which is 5 nm longer than the wavelength of $\lambda_0$ is incident to the objective lens at the environmental temperature which is the first ambient temperature $T_0 = 25°$ C., $\Delta fB$ defined by $$\Delta fB = |fB(\lambda_1, T_0) - fB(\lambda_0, T_0)| \quad (5)$$

satisfies a following formula:

$$\Delta fB < 0.001 \text{ mm} \quad (6)$$

The operation and effect of this invention is the same as the operation and effect in accordance with the first embodiment.

An optical pickup device according to a further variation of the third embodiment is characterized in that the objective lens is an objective lens of a finite conjugate type for converging a diverging light beam emitted from the light source to the information recording surface of the optical information recording medium and satisfies a following formula:

$$0.8 > f > 0.2 \quad (6A)$$

The operation and effect of this invention is the same as the operation and effect consistent with the first embodiment.

An optical pickup device according to another variation of the third embodiment is characterized in that m satisfies a following formula when m is an image formation magnification of the objective lens:

$$0.2 > |m| > 0.02 \quad (6B)$$

The operation and effect of this invention is the same as the operation and effect of the first embodiment.

An optical pickup device in accordance with a further variation of the third embodiment is characterized in that the objective lens and the light source are united by an actuator at least to be driven for tracking.

In an objective lens of an finite conjugate type to which a diverging light beam is made incident, coma aberration generated by tracking error is a problem. This reason is that the emitting point becomes an off-axis object point for the objective lens when the objective lens is decentered from the emitting point of light source by tracking error. Though decentering of the objective lens due to tracking error is about 0.2 to 0.3 mm in an ordinary optical pickup device, the objective lens of the present invention is a lens having a short focal length satisfying the above-described formula (6A), and accordingly coma aberration and astigmatic aberration are generated significantly and it is impossible to perform good recording/reproducing to an optical information recording medium when the objective lens is decentered by about 0.2 to 0.3 mm by tracking error. Therefore, the optical pickup device of a variation of the third embodiment was configured such that the objective lens and the light source are united by an actuator at least to be driven for tracking. Thereby, it is possible to solve the problem that coma aberration and astigmatic aberration are generated by tracking error.

An optical pickup device according to a fourth embodiment comprises: a light source; and a converging optical system including an objective lens for converging a light beam emitted from the light source to an information recording surface of an optical information recording medium, and is capable of recording and/or reproducing information by converging the light beam emitted from the light source to the information recording surface of the optical information recording medium with the converging optical system, wherein the objective lens is a plastic single lens that comprises a ring-shaped phase structure on at least one optical surface, the ring-shaped phase structure comprising a plurality of ring surfaces and formed so that adjacent ring surfaces generate a predetermined optical path difference for incident light, and satisfies following formulas:

$$NA \geq 0.8 \quad (7)$$

$$1.3 > f > 0.2 \quad (8)$$

where NA is an image-side numerical aperture of the objective lens, which is required for recording and/or reproducing information for the optical information recording medium and f (mm) is a focal length of the objective lens.

The operation and effect of this invention is the same as the operation and effect of the second embodiment.

An optical pickup device consistent with a variation of the fourth embodiment is characterized in that the ring-shaped phase structure is a diffraction structure having a function for diffracting predetermined incident light and the objective lens forms a converging wave front which is converged on the information recording surface owing to an effect obtained by combining a diffraction effect and a refraction effect. The operation and effect of this invention is the same as the operation and effect according to the second embodiment.

An optical pickup device according to another variation of the fourth embodiment is characterized in that the objective lens has spherical aberration characteristics that spherical aberration changes in an undercorrected direction when a wavelength of the incident light changes to a longer wavelength. The operation and effect of this invention is the same as the operation and effect of the second embodiment.

An optical pickup device consistent with a further variation of the fourth embodiment is characterized in that when an optical path difference added to a wave front transmitted through the diffraction structure is denoted by an optical path difference function $\phi_b$ defined by $$\phi_b = b_2 \cdot h^2 + b_4 \cdot h^4 + b_6 \cdot h^6 + \ldots$$

(wherein $b_2, b_4, b_6 \ldots$ are 2nd-order, 4th-order, 6th-order $\ldots$ optical path difference function coefficients, respectively), a following formula is satisfied:

$$-70 < (b_4 \cdot h_{MAX}^4)/(f \cdot \lambda_0 \cdot 10^{-6} \cdot (NA \cdot (1-m))^4) < -20 \quad (8A)$$

wherein $\lambda_0$ (nm) is a design wavelength of the objective lens, $h_{MAX}$ is an effective diameter maximum height (mm) of the optical surface on which the diffraction structure is formed and m is an image formation magnification of the objective lens. The operation and effect of this invention is the same as the operation and effect consistent with the second embodiment.

An optical pickup device according to a variation of the fourth embodiment is characterized in that the ring-shaped phase structure generates the predetermined optical path difference for the incident light by forming the adjacent ring surfaces so as to be displaced in an optical axis direction each other, and the objective lens forms a converging wave front which is converged on the information recording surface owing to a refraction effect. The operation and effect of this invention is the same as the operation and effect according to the second embodiment.

The optical pickup device according to the fourth embodiment is characterized in that when a ring surface including an optical axis is called a central ring surface, a ring surface adjacent to an outside of the central ring surface is formed to be displaced in the optical axis direction so as to have a shorter optical path length than the central ring surface, a ring surface at a maximum effective diameter position is formed to be displaced in the optical axis direction so as to have a longer optical path length than an ring surface adjacent to an inside thereof, and a ring surface at a position of 75% of a maximum effective diameter is formed to be displaced so as to have a shorter optical path length than a ring surface adjacent to an inside thereof and a ring surface adjacent to an outside thereof. The operation and effect of this invention is the same as the operation and effect in accordance with the second embodiment.

An optical pickup device consistent with a variation of the fourth embodiment is characterized in that a total of the ring surfaces is from 3 to 20. The operation and effect of this invention is the same as the operation and effect according to the second embodiment.

An optical pickup device according to a variation of the fourth embodiment is characterized in that when $\Delta_j$ (μm) is a step amount of an arbitrary step of steps in the optical axis direction at a boundary of mutually adjacent ring surfaces in a ring-shaped phase structure formed in a region from a height of 75% to a height of 100% of an effective diameter maximum height of the optical surface on which the ring-shaped phase structure is formed and n is a refractive index of the objective lens at a design wavelength of $\lambda_0$ (nm), $m_j$ represented by $$m_j = INT(X) \quad (8B)$$

(wherein $X = \Delta_j \cdot (n-1)/(\lambda_0 \cdot 10^{-3})$) and INT(X) is an integer obtained by half adjust of X) is an integer not less than 2. The operation and effect of this invention is the same as the operation and effect of the second embodiment.

An optical pickup device in accordance with the fourth embodiment is characterized in that when $W(\lambda_0, T_0)$ is an RMS value of residual aberration of the objective lens when light having a wavelength of $\lambda_0$ (nm) which is a design wavelength thereof is incident to the objective lens at an environmental temperature which is a first ambient temperature $T_0 = 25°$ C., $W(\lambda_1, T_0)$ is an RMS value of residual aberration of the objective lens when light having a wavelength of $\lambda_1$ (nm) which is 5 nm longer than the wavelength of $\lambda_0$ is incident to the objective lens at the environmental temperature which is the first ambient temperature $T_0 = 25°$ C. and $W(\lambda_2, T_1)$ is an RMS value of residual aberration of the objective lens when light having a wavelength of $\lambda_2$ (nm) is incident to the objective lens at the environmental temperature which is a second ambient temperature $T_1 = 55°$ C., $\Delta W1$ and $\Delta W2$ defined by $$\Delta W1 = |W(\lambda_2, T_1) - W(\lambda_0, T_0)| \quad (9)$$

$$\Delta W2 = |W(\lambda_1, T_0) - W(\lambda_0, T_0)| \quad (10)$$

satisfy following formulas:

$$\Delta W1 < 0.035 \, \lambda \text{rms} \quad (11)$$

$$\Delta W2 < 0.035 \, \lambda \text{rms} \quad (12)$$

wherein
when $\lambda_0 < 600$ nm, $\lambda_2 = \lambda_0 + 1.5$ (nm) and
when $\lambda_0 \geq 600$ nm, $\lambda_2 = \lambda_0 + 6$ (nm).

The operation and effect of this invention is the same as the operation and effect consistent with the second embodiment.

Preferably, an optical pickup device according to the fourth embodiment satisfies a following formula:

$$\sqrt{((\Delta W1)^2 + (\Delta W2)^2)} < 0.05 \, \lambda \text{rms} \quad (13)$$

The operation and effect of this invention is the same as the operation and effect of the second embodiment.

In an optical pickup device consistent with the fourth embodiment, the objective lens is an objective lens of a finite conjugate type for converging a diverging light beam emitted from the light source on the information recording surface and satisfies a following formula:

$$1.1 > f > 0.2 \quad (13A)$$

The operation and effect of this invention is the same as the operation and effect of consistent with the second embodiment.

An optical pickup device according to a variation of the fourth embodiment satisfies a following formula when m is an image formation magnification of the objective lens in the invention of the previous variation of the fourth embodiment:

$$0.2 > |m| > 0.02 \quad (13B)$$

The operation and effect of this invention is the same as the operation and effect in accordance with the second embodiment.

An optical pickup device consistent with the fourth embodiment is characterized in that the objective lens and the light source are united by an actuator at least to be driven for tracking. The operation and effect of this invention is the same as the operation and effect according to the third embodiment.

An optical pickup device of the present invention, satisfies a following formula:

$$0.8 < d/f < 1.8 \quad (14)$$

where d (mm) is a lens thickness in an optical axis of the objective lens and f (mm) is a focal length.

The operation and effect of this invention is the same as the operation and effect consistent with the second embodiment.

An optical pickup device of the present invention is characterized in that the design wavelength of $\lambda_0$ (nm) of the objective lens satisfies a following formula:

$$500 \leq \lambda_0 \geq 350 \quad (15)$$

The operation and effect of this invention is the same as the operation and effect of in accordance with the second embodiment.

An optical pickup device of the present invention satisfies a following formula:

$$0.40 \leq (X1-X2) \cdot (N-1)/(NA \cdot f \cdot \sqrt{(1+|m|)}) \leq 0.63 \quad (16)$$

wherein

X1: a distance (mm) in an optical axis direction between a plane that is perpendicular to an optical axis and tangent to a top of an optical surface on a light source side and an optical surface on the light source side in a most peripheral portion of an effective diameter (position of the NA on a surface on the light source side to which a marginal light beam is made incident), wherein plus is a case of measurement for a direction of the optical information recording medium with reference to the tangent plane and minus is a case of measurement for a direction of the light source, X2: a distance (mm) in an optical axis direction between a plane that is perpendicular to an optical axis and tangent to a top of an optical surface on an optical information recording medium side and an optical surface on the optical information recording medium side in a most peripheral portion of an effective diameter (position of the NA on a surface on the optical information recording medium side to which a marginal light beam is made incident), wherein plus is a case of measurement for a direction of the optical information recording medium with reference to the tangent plane and minus is a case of measurement for a direction of the light source, N: a refractive index of the objective lens at the design wavelength of $\lambda_0$, f: a focal length (mm) of the objective lens, and m: an image formation magnification of the objective lens.

The operation and effect of this invention is the same as the operation and effect consistent with the second embodiment.

An optical information recording/reproducing apparatus according to the fifth embodiment comprises optical pickup device that comprises: a light source; and a converging optical system including an objective lens for converging a light beam emitted from the light source to an information recording surface of an optical information recording medium, and is capable of recording and/or reproducing information by converging the light beam emitted from the light source to the information recording surface of the optical information recording medium with the converging optical system, wherein the objective lens is a plastic single lens and satisfies following formulas:

$$NA \geq 0.8 \quad (1)$$

$$1.0 > f > 0.2 \quad (2)$$

where NA is an image-side numerical aperture of the objective lens, which is required for recording and/or reproducing information to the optical information recording medium and f (mm) is a focal length of the objective lens.

The operation and effect of this invention is the same as the operation and effect consistent with the first embodiment.

An optical information recording/reproducing apparatus according to a variation of the fifth embodiment is characterized in that when $W(\lambda_0, T_0)$ is an RMS value of residual aberration of the objective lens when light having a wavelength of $\lambda_0$ (nm) which is a design wavelength thereof is incident to the objective lens at an environmental temperature which is a first ambient temperature $T_0=25°$ C. and $W(\lambda_0, T_1)$ is an RMS value of residual aberration of the objective lens when light having the wavelength of $\lambda_0$ (nm) which is a design wavelength thereof is incident to the objective lens at the environmental temperature which is a second ambient temperature $T_1=55°$ C., $\Delta W$ defined by $$\Delta W = |W(\lambda_0, T_1) - W(\lambda_0, T_0)| \quad (3)$$

satisfies a following formula:

$$\Delta W < 0.035 \, \lambda rms \quad (4)$$

The operation and effect of this invention is the same as the operation and effect according to the first embodiment.

An optical information recording/reproducing apparatus in accordance with a variation of the fifth embodiment is characterized in that the design wavelength $\lambda_0$ of the optical objective lens is not more than 500 nm, and in case that $fB(\lambda_0, T_0)$ is a back focal length of the objective lens when light having a wavelength of $\lambda_0$ (nm) is incident to the objective lens at an environmental temperature which is a first ambient temperature $T_0=25°$ C. and $fB(\lambda_1, T_0)$ is a back focal length of the objective lens when light having a wavelength of $\lambda_1$ (nm) which is 5 nm longer than the wavelength of $\lambda_0$ is incident to the objective lens at the environmental temperature which is the first ambient temperature $T_0=25°$ C., $\Delta fB$ defined by $$\Delta fB = |fB(\lambda_1, T_0) - fB(\lambda_1, T_0)| \quad (5)$$

satisfies a following formula:

$$\Delta fB < 0.001 \, mm \quad (6)$$

The operation and effect of this invention is the same as the operation and effect according to the first embodiment.

An optical information recording/reproducing apparatus according to the fifth embodiment is characterized in that the objective lens is an objective lens of a finite conjugate type for converging a diverging light beam emitted from the light source to the information recording surface of the optical information recording medium and satisfies a following formula:

$$0.8 > f > 0.2 \quad (6A)$$

The operation and effect of this invention is the same as the operation and effect of the first embodiment.

An optical information recording/reproducing apparatus in accordance with the fifth embodiment is characterized in that m satisfies a following formula when m is an image formation magnification of the objective lens:

$$0.2 > |m| > 0.02 \quad (6B)$$

The operation and effect of this invention is the same as the operation and effect of consistent with the first embodiment.

An optical information recording/reproducing apparatus is characterized in that the objective lens and the light source are united by an actuator at least to be driven for tracking. The operation and effect of this invention is the same as the operation and effect of the third embodiment.

An optical information recording/reproducing apparatus according to the sixth embodiment comprises an optical pickup device that comprises: a light source; and a converging optical system including an objective lens for converging a light beam emitted from the light source to an information recording surface of an optical information recording medium, and is capable of recording and/or reproducing information by converging the light beam emitted from the light source to the information recording surface of the optical information recording medium with the converging optical system, wherein the objective lens is a plastic single lens that comprises a ring-shaped phase structure on at least one optical surface, the ring-shaped phase structure comprising a plurality of ring surfaces and formed so that adjacent ring surfaces generate a predetermined optical path difference for incident light, and satisfies following formulas:

$$NA \geq 0.8 \tag{7}$$

$$1.3 > f > 0.2 \tag{8}$$

where NA is an image-side numerical aperture of the objective lens, which is required for recording and/or reproducing information for the optical information recording medium and f (mm) is a focal length of the objective lens.

The operation and effect of this invention is the same as the operation and effect consistent with the second embodiment.

An optical information recording/reproducing apparatus consistent with a variation of the sixth embodiment is characterized in that the ring-shaped phase structure is a diffraction structure having a function for diffracting predetermined incident light and the objective lens forms a converging wave front which is converged on the information recording surface owing to an effect obtained by combining a diffraction effect and a refraction effect. The operation and effect of this invention is the same as the operation and effect according to the second embodiment.

An optical information recording/reproducing apparatus according to the sixth embodiment is characterized in that the objective lens has spherical aberration characteristics that spherical aberration changes in an undercorrected direction when a wavelength of the incident light changes to a longer wavelength. The operation and effect of this invention is the same as the operation and effect of the second embodiment.

An optical information recording/reproducing apparatus in accordance with the sixth embodiment is characterized in that when an optical path difference added to a wave front transmitted through the diffraction structure is denoted by an optical path difference function $\phi_b$ defined by $$\phi_b = b_2 \cdot h^2 + b_4 \cdot h^4 + b_6 \cdot h^6 + \ldots$$

(wherein $b_2$, $b_4$, $b_6$ ... are 2nd-order, 4th-order, 6th-order ... optical path difference function coefficients, respectively), a following formula is satisfied:

$$-70 \leq (b_4 \cdot h_{MAX}^4)/(f \cdot \lambda_0 10^{-6} \cdot (NA \cdot (1-m))^4) \leq -20 \tag{8A}$$

wherein $\lambda_0$ (nm) is a design wavelength of the objective lens, $h_{max}$ is an effective diameter maximum height (mm) of the optical surface on which the diffraction structure is formed and m is an image formation magnification of the objective lens. The operation and effect of this invention is the same as the operation and effect in accordance with the second embodiment.

An optical information recording/reproducing apparatus according to a further variation of the sixth embodiment is characterized in that the ring-shaped phase structure generates the predetermined optical path difference for the incident light by forming the adjacent ring surfaces so as to be displaced in an optical axis direction each other, and the objective lens forms a converging wave front which is converged on the information recording surface owing to a refraction effect. The operation and effect of this invention is the same as the operation and effect consistent with the second embodiment.

The optical information recording/reproducing apparatus consistent with a variation of the sixth embodiment is characterized in that when a ring surface including an optical axis is called a central ring surface, a ring surface adjacent to an outside of the central ring surface is formed to be displaced in the optical axis direction so as to have a shorter optical path length than the central ring surface, a ring surface at a maximum effective diameter position is formed to be displaced in the optical axis direction so as to have a longer optical path length than a ring surface adjacent to an inside thereof, and a ring surface at a position of 75% of a maximum effective diameter is formed to be displaced so as to have a shorter optical path length than a ring surface adjacent to an inside thereof and a ring surface adjacent to an outside thereof. The operation and effect of this invention is the same as the operation and effect in accordance with the second embodiment.

An optical information recording/reproducing apparatus according to the sixth embodiment is characterized in that a total of the ring surfaces is from 3 to 20. The operation and effect of this invention is the same as the operation and effect of the second embodiment.

An optical information recording/reproducing apparatus consistent with a variation of the sixth embodiment is characterized in that when $\Delta_j$ (μm) is a step amount of an arbitrary step of steps in the optical axis direction at a boundary of mutually adjacent ring surfaces in a ring-shaped phase structure formed in a region from a height of 75% to a height of 100% of an effective diameter maximum height of the optical surface on which the ring-shaped phase structure is formed and n is a refractive index of the objective lens at a design wavelength of $\lambda_0$ (nm), $m_j$ represented by $$m_j = INT(X) \tag{8B}$$

(wherein $X = \Delta_j \cdot (n-1)/(\lambda_0 10^{-3})$ and INT(X) is an integer obtained by half adjust of X) is an integer not less than 2. The operation and effect of this invention is the same as the operation and effect in accordance with the second embodiment.

An optical information recording/reproducing apparatus consistent with the sixth embodiment is characterized in that in case that $W(\lambda_0, T_0)$ is an RMS value of residual aberration of the objective lens when light having a wavelength of $\lambda_0$ (nm) which is a design wavelength thereof is incident to the objective lens at an environmental temperature which is a first ambient temperature $T_0=25°$ C., $W(\lambda_1, T_0)$ is an RMS value of residual aberration of the objective lens when light having a wavelength of $\lambda_1$ (nm) which is 5 nm longer than the wavelength of $\lambda_0$ is incident to the objective lens at the environmental temperature which is the first ambient temperature $T_0=25°$ C., and $W(\lambda_2, T_1)$ is an RMS value of residual aberration of the objective lens when light having a wavelength of $\lambda_2$ (nm) is incident to the objective lens at the environmental temperature which is a second ambient temperature $T_1=55°$ C., $\Delta W1$ and $\Delta W2$ defined by $$\Delta W1 = |W(\lambda_2, T_1) - W(\lambda_0, T_0)| \quad (9)$$

$$\Delta W2 = |W(\lambda_1, T_0) - W(\lambda_0, T_0)| \quad (10)$$

satisfy following formulas:

$$\Delta W1 < 0.035 \; \lambda\text{rms} \quad (11)$$

$$\Delta W2 < 0.035 \; \lambda\text{rms} \quad (12)$$

wherein when $\lambda_0 < 600$ nm, $\lambda_2 = \lambda_0 + 1.5$ (nm) and when $\lambda_0 \geq 600$ nm, $\lambda_2 = \lambda_0 + 6$ (nm).

The operation and effect of this invention is the same as the operation and effect according to the second embodiment.

Preferably, an optical information recording/reproducing apparatus of a variation of the sixth embodiment satisfies a following formula:

$$\sqrt{((\Delta W1)^2 + (\Delta W2)^2)} < 0.05 \; \lambda\text{rms} \quad (13)$$

The operation and effect of this invention is the same as the operation and effect according to the second embodiment.

An optical information recording/reproducing apparatus consistent with the sixth embodiment is characterized in that an objective lens of a finite conjugate type for converging a diverging light beam emitted from the light source on the information recording surface satisfies a following formula. The operation and effect of this invention is the same as the operation and effect consistent with the second embodiment.

$$1.1 > f > 0.2 \quad (13A)$$

An optical information recording/reproducing apparatus according to a variation of the sixth embodiment satisfies a following formula when m is an image formation magnification of the objective lens consistent with a variation of the sixth embodiment.

The operation and effect of this invention is the same as the operation and effect of the second embodiment.

$$0.2 > |m| > 0.02 \quad (13B)$$

An optical information recording/reproducing apparatus in accordance with a variation of the sixth embodiment is characterized in that the objective lens and the light source are united by an actuator at least to be driven for tracking. The operation and effect of this invention is the same as the operation and effect of the third embodiment.

An optical information recording/reproducing apparatus of the present invention satisfies a following formula:

$$0.8 < d/f < 1.8 \quad (14)$$

where d (mm) is a lens thickness in an optical axis of the objective lens and f (mm) is a focal length.

The operation and effect of this invention is the same as the operation and effect consistent with the second embodiment.

An optical information recording/reproducing apparatus of the present invention is characterized in that the design wavelength of $\lambda_0$ (nm) of the objective lens satisfies a following formula:

$$500 \geq \lambda_0 \geq 350 \quad (15)$$

The operation and effect of this invention is the same as the operation and effect of the second embodiment.

An optical information recording/reproducing apparatus of the present invention satisfies a following formula:

$$0.40 \leq (X1 - X2) \cdot (N-1)/(NA \cdot f \cdot \sqrt{(1+|m|)}) \leq 0.63 \quad (16)$$

where

X1: a distance (mm) in an optical axis direction between a plane that is perpendicular to an optical axis and tangent to a top of an optical surface on a light source side and an optical surface on the light source side in a most peripheral portion of an effective diameter (position of the NA on a surface on the light source side to which a marginal light beam is incident), wherein X1 is plus in a case of measuring X1 in a direction of the optical information recording medium with reference to the tangent plane, and minus in a case of measuring X1 in a direction of the light source, X2: a distance (mm) in an optical axis direction between a plane that is perpendicular to an optical axis and tangent to a top of an optical surface on an optical information recording medium side and an optical surface on the optical information recording medium side in a most peripheral portion of an effective diameter (position of the NA on a surface on the optical information recording medium side to which a marginal light beam is incident), wherein X2 is plus in a case of measuring X2 in a direction of the optical information recording medium with reference to the tangent plane and minus ma case of measuring X2 in a direction of the light source, N: a refractive index of the objective lens at the design wavelength of $\lambda_0$, f: a focal length (mm) of the objective lens, and m: an image formation magnification of the objective lens.

The operation and effect of this invention is the same as the operation and effect in accordance with the second embodiment.

BEST MODE FOR CARRYING OUT OF THE INVENTION

Figure 1:
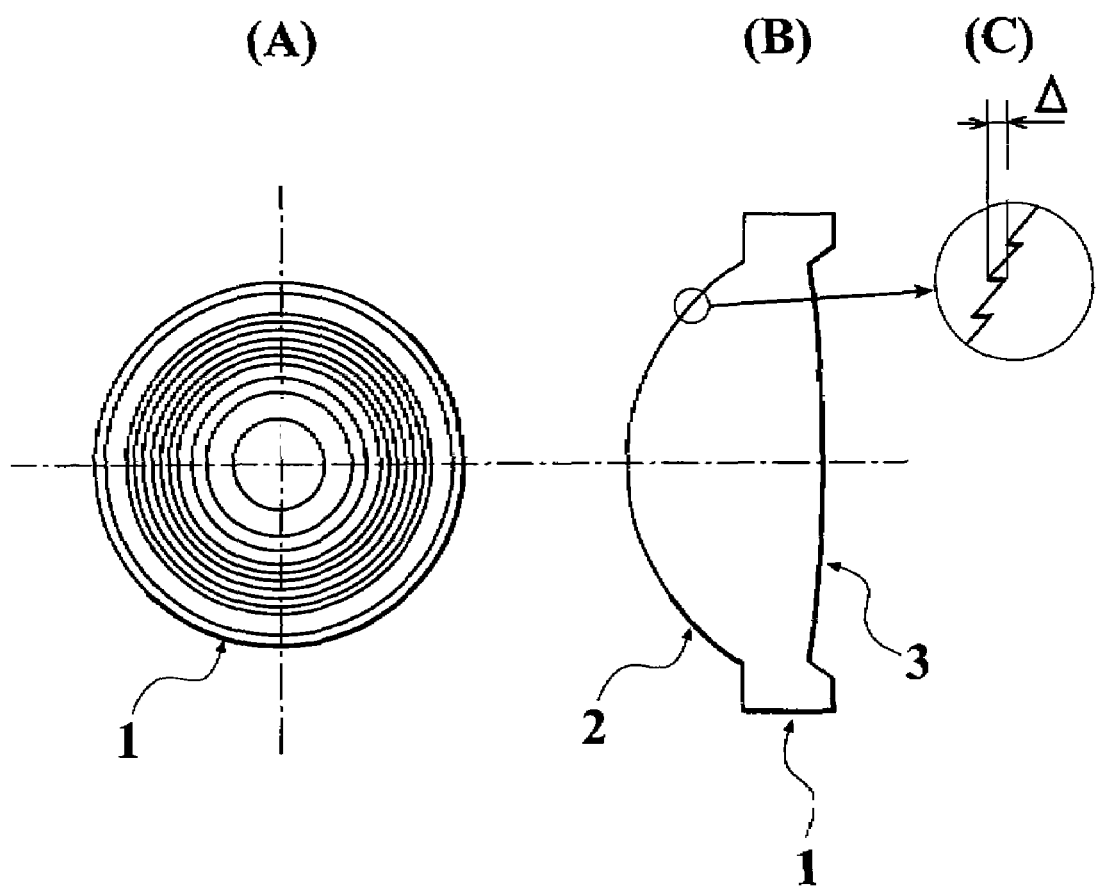
FIG. 1 is a schematic view showing an objective lens 1 of the present embodiment.

Hereinafter, embodiments according to the present invention will be described with the use of drawings. FIG. 1 is a schematic view showing an objective lens 1 of the present embodiment, and (A) is a front view, (B) is a side view and (C) is a view expanding the side. The objective lens 1 is applied to, for example, an optical pickup device for recording/reproducing a high-density DVD, an MO or the like using a short wavelength light source such as a blue-violet laser diode, and has a function for converging laser light emitted from the light source onto an information recording surface of an optical disk.

The objective lens 1 is a biconvex plastic single lens having two aspherical optical surfaces 2 and 3. As shown in FIG. 1(A), a ring-shaped phase structure as a concentric diffraction structure where the optical axis is the center is formed on the optical surface 2. As shown in FIG. 1(C), the ring-shaped phase structure has a step Δ in the direction of the optical axis at the boundary of each ring surface as a Fresnel lens. Laser light made incident to any ring surface of the ring-shaped phase structure is diffracted to the direction that is determined by the width of the ring surface in the direction perpendicular to the optical axis (in the present description, such a width of a ring surface in the direction perpendicular to the optical axis referred to as a "ring surface pitch").

The ring-shaped phase structure has spherical aberration characteristics that spherical aberration changes in the undercorrected direction as the wavelength of the incident light increases. Because the refractive index of plastic single lens decreases owing to temperature rise, the spherical aberration changes in the overcorrected direction. On the other hand, the emission wavelength of a laser diode change in the direction to become long owing to temperature rise. For example, because a blue-violet laser diode has change of an emission wavelength by +0.05 nm/° C. owing to temperature rise, the wavelength increases by 1.5 nm when the temperature rises by +30° C. Accordingly, owing to providing an objective lens having spherical aberration characteristics that spherical aberration changes in the undercorrected direction as the wavelength of the incident light increases, change of spherical aberration that is made overcorrection by change of the refractive index accompanying temperature rise can be counterbalanced by change of spherical aberration that is made undercorrection by change of the emission wavelength of a laser diode due to temperature rise.

In order to correct spherical aberration by diffraction effect of the ring-shaped phase structure in this way, it is necessary to generate chromatic spherical aberration designedly. However, when thermal aberration of a plastic single lens having a high NA is tried to be corrected completely, the generation amount of chromatic spherical aberration must be configured to be large and accordingly, it is impossible to use a laser diode having the emission wavelength that deviates from a standard wavelength owing to manufacturing error. As for the objective lens 1, in order to decrease the amount of correction of thermal aberration, the focal length is set to satisfy the formulas (8) or (13A), and additionally, the correction of thermal aberration and the generation amount of chromatic spherical aberration are matched so as to respectively satisfy the formulas (11) to (13). Accordingly, the objective lens 1 is a plastic single lens having a high NA and yet a lens having good thermal aberration and chromatic spherical aberration.

Figure 2:
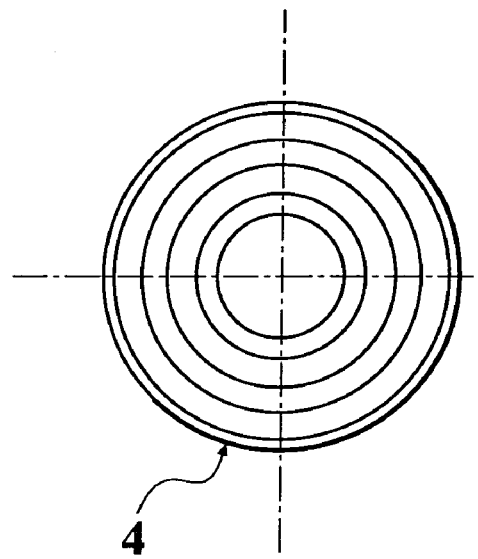
FIG. 2 is a schematic view showing an objective lens 4 of the present embodiment.
Figure 2:
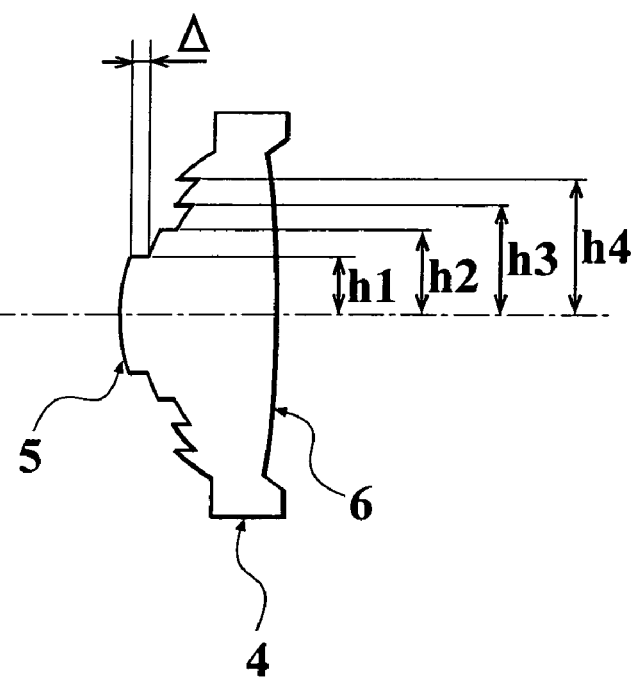

FIG. 2 is a schematic view showing an objective lens 4 of another embodiment, and (A) is a front view and (B) is a side view. The optical surface 2 is, in the same way as the objective lens 1, applied to an optical pickup device for recording/reproducing a high-density DVD, an MO or the like using a short wavelength light source such as a blue-violet laser diode, and has a function for converging laser light emitted from the light source onto an information recording surface of an optical disk.

The objective lens 4 is a biconvex plastic single lens having two aspherical optical surfaces 5 and 6. As shown in FIG. 2(A), a ring-shaped phase structure as a concentric diffraction structure where the optical axis is the center is formed on the optical surface 5. The ring-shaped phase structure has a step Δ at the boundary of each ring surface in the optical axis direction, and each step Δ is determined in such a way that laser lights transmitted through adjacent ring surfaces have an optical path difference of wavelength of integral multiple of the wavelength in 25° C., which is the design temperature.

Furthermore, as shown in FIG. 2(B), the ring-shaped phase structure comprises at least one ring surface formed to be displaced in the optical axis direction so as to have an optical path length shorter than the ring surface lying adjacent to the inside thereof, and at least one ring surface formed to be displaced in the optical axis direction so as to have an optical path length longer than the ring surface lying adjacent to the inside thereof, wherein the ring surface formed to be displaced in the optical axis direction so as to have an optical path length shorter than the ring surface lying adjacent to the inside thereof is formed on the closer side to the optical axis than the ring surface formed to be displaced in the optical axis direction so as to have an optical path length longer than the ring surface lying adjacent to the inside thereof. Hereinafter, principle of correction of thermal aberration of the plastic single lens by the ring-shaped phase structure determined in this way will be described.

Figure 3:
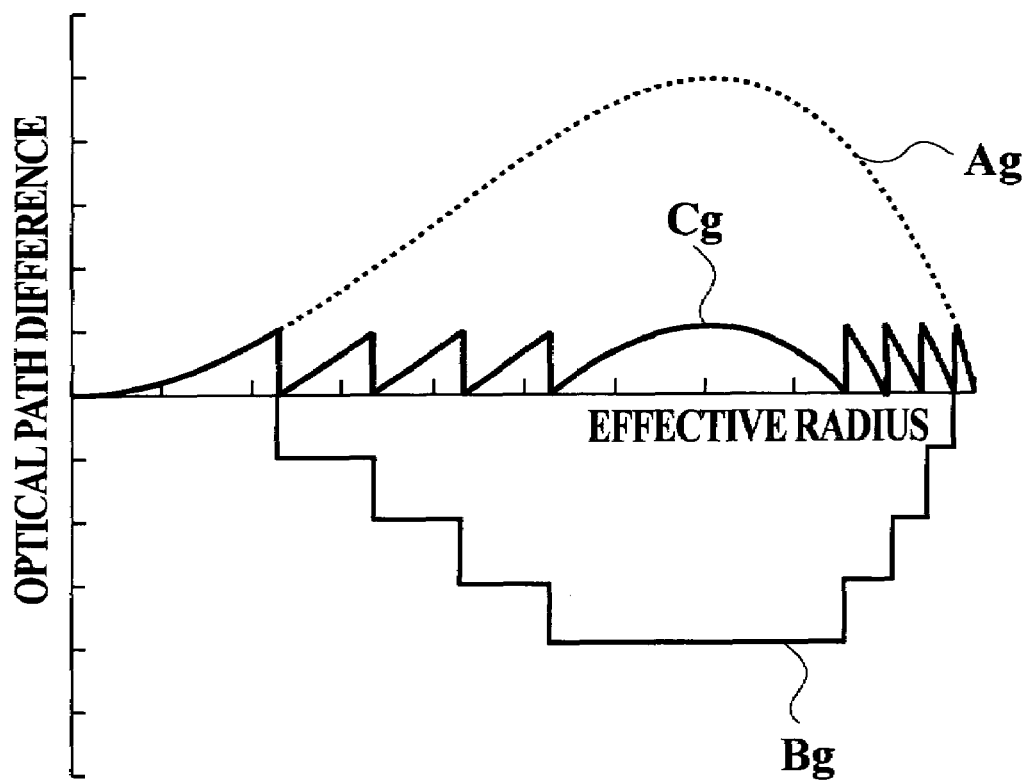
FIG. 3 is a view showing a situation of a wave front of a biconvex plastic single lens having two optical surfaces which are aspherical in case of temperature rising from a design temperature by 30° C.

FIG. 3 is a view showing a situation of a wave front of a biconvex plastic single lens having two optical surfaces which are aspherical in case of temperature rising from a design temperature by 30° C., and the abscissa axis denotes an effective radius of the optical surface and the ordinate axis denotes an optical path difference. In the plastic single lens, spherical aberration is generated by the influence of change of the refractive index accompanying temperature rise, and a wave front is changed as line drawing Ag in FIG. 3. Line drawing Bg in FIG. 3 shows an optical path difference added to a transmitted wave front by the ring-shaped phase structure determined as described above, and Line drawing Cg shows a situation of a wave front transmitted through the ring-shaped phase structure and plastic single lens in case of temperature rising from a design temperature by 30° C. From line drawings Bg and Cg, it is understood that, owing to counterbalance of the wave front transmitted the ring-shaped phase structure and the wave front of the plastic single lens in case of temperature rising from the design temperature by 30° C., a wave front of laser light converged on the information recording surface of an optical disk becomes a good wave front with no optical path difference from a broad view and thermal aberration of the plastic single lens is corrected by the ring-shaped phase structure.

In the same way as the case of correcting thermal aberration by diffraction effect of the ring-shaped phase structure as a diffraction structure, in the case of correcting thermal aberration of a plastic single lens having a high NA by the effect of a ring-shaped phase structure determined as above, it is impossible to use a laser diode having an emission wavelength that deviates from a standard wavelength by a manufacturing error because trying to completely correct thermal aberration causes the generation amount of chromatic spherical aberration to be too large.

As for the objective lens 4, in order to decrease the amount of correction of thermal aberration, the focal length is set to satisfy the formulas (8) or (13A), and additionally, the correction of thermal aberration and the generation amount of chromatic spherical aberration are matched so as to respectively satisfy the formulas (11) to (13). Accordingly, the objective lens 4 is a plastic single lens having a high NA and yet a lens having good thermal aberration and chromatic spherical aberration in the same way as the objective lens 1.

Figure 4:
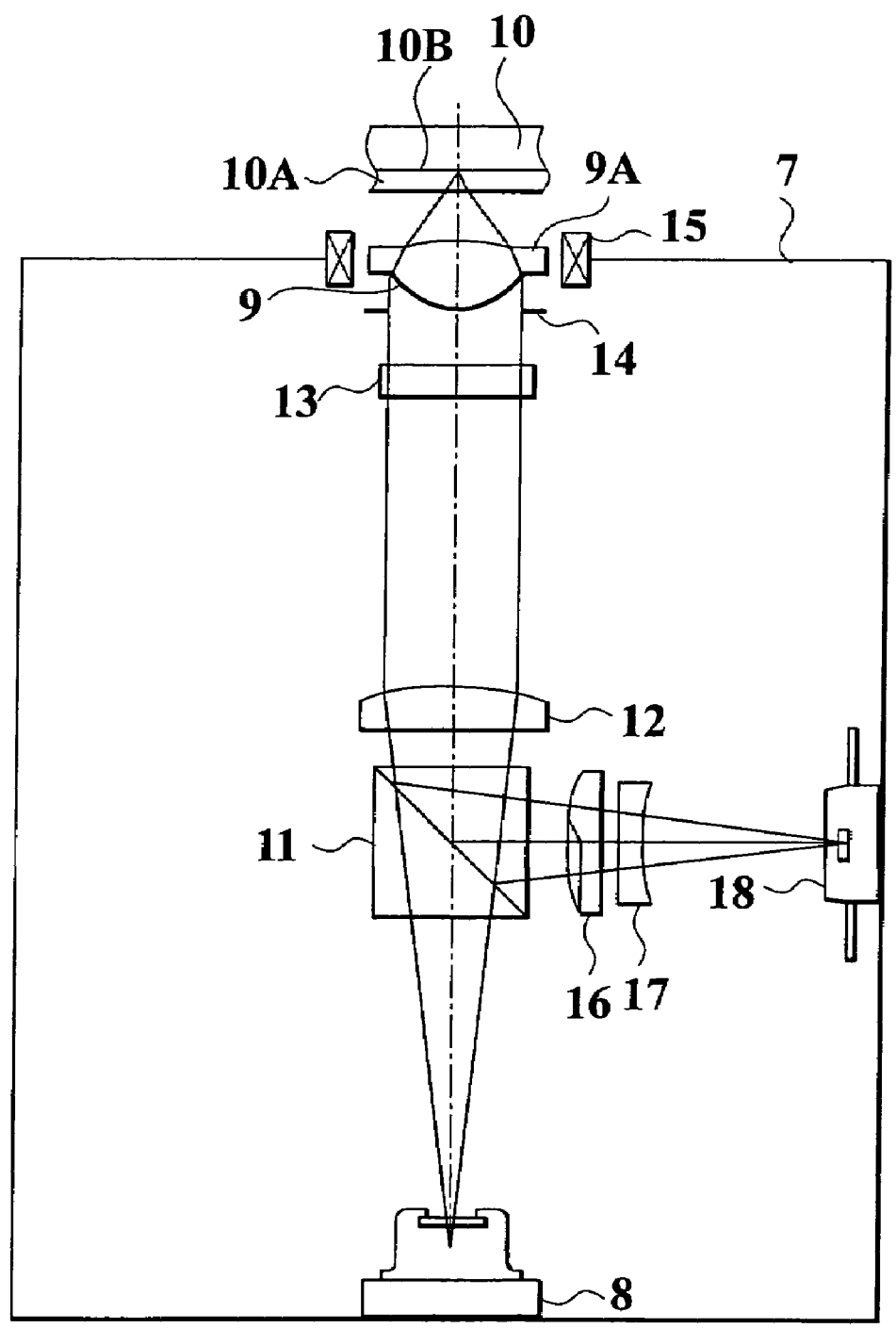
FIG. 4 is a view schematically showing the configuration of an optical pickup device (optical information recording/reproducing apparatus) of the first embodiment.

FIG. 4 is a view schematically showing the configuration of an optical pickup device (optical information recording/reproducing apparatus) equipped with the objective lens of the present invention. The optical pickup device 7 comprises a laser diode 8 as a light source and an objective lens 9.

The laser diode 8 is a GaN-based blue-violet laser diode generating light having a wavelength of about 400 nm. A light source generating light having a wavelength of about 400 nm may employ an SHG blue-violet laser diode, besides the above-described GaN-based blue-violet laser diode.

The objective lens 9 is any one of a plastic single lens whose focal length satisfies the formula (2), the objective lens 1 of FIG. 1 and the objective lens 4 of FIG. 2. The objective lens 9 comprises a flange portion 9A extending perpendicularly to the optical axis. The objective lens 9 can be attached to the optical pickup device 7 accurately by the flange portion 9A. The numerical aperture of the objective lens 9 on the side of an optical disk 10 is made not less than 0.80.

A diverging light beam emitted from the laser diode 8 is transmitted through a polarization beam splitter 11 and passes through a collimating lens 12 and quarter-wave plate 13 to become a circularly polarized parallel light beam, and subsequently, has the light beam diameter regulated by a stop 14 and is made a spot that is passed through a protective layer 10A of the optical disk 10 of a high-density DVD and formed on an information recording surface 10B by the objective lens 9. As for the objective lens 9, focus control and tracking control are performed by an actuator 15 disposed around it.

A reflected beam light modulated by information bit in the information recording surface 10B is transmitted again through the objective lens 9, the stop 14, the quarter-wave plate 13 and the collimating lens 12, and subsequently, is made a converged light beam, reflected by the polarization beam splitter 11, provided with astigmatic aberration by passing through a cylindrical lens 16 and concave lens 17, and converged on an optical detector 18. Subsequently, it is possible to read information recorded on the optical disk 10 by using an output signal of the optical detector 18.

Figure 6:
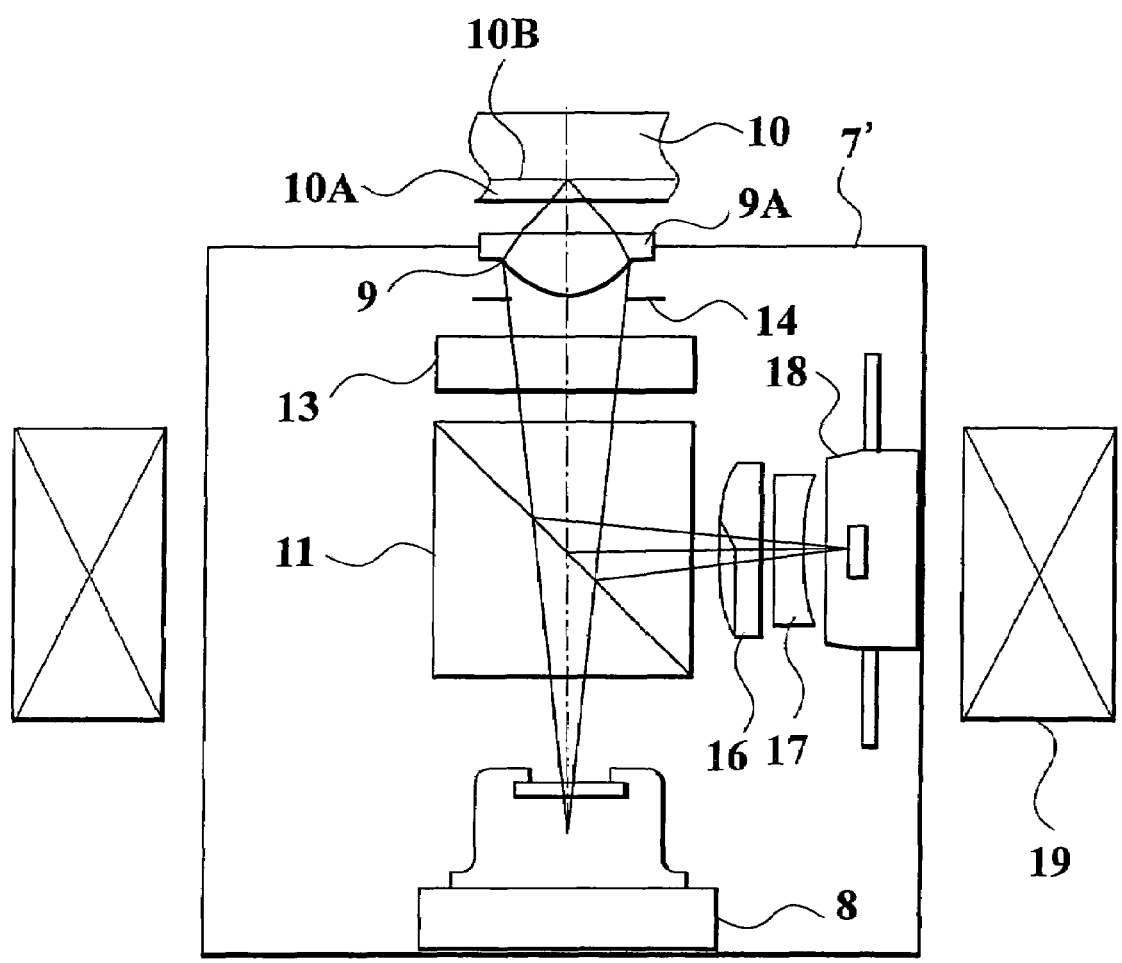
FIG. 6 is a view schematically showing the configuration of an optical pickup device (optical information recording/reproducing apparatus) of the second embodiment.

FIG. 6 is a view schematically showing the configuration of another optical pickup device (optical information recording/reproducing apparatus) equipped with an objective lens of the present invention. The optical pickup device 7' comprises a laser diode 8 as a light source and an objective lens 9.

The laser diode 8 is a GaN-based blue-violet laser diode generating light having a wavelength of about 400 nm. A light source generating light having a wavelength of about 400 nm may employ an SHG blue-violet laser diode, besides the above-described GaN-based blue-violet laser diode.

The objective lens 9 is any one of a plastic single lens whose focal length satisfies the formula (6A), the above-described objective lens 1 of FIG. 1 and the objective lens 4 of FIG. 2. The objective lens 9 is an objective lens of the finite conjugate type for converging a diverging light beam emitted from the laser diode 8 on an information recording surface 10B through a protective layer 10A of the optical disk 10 of a high-density DVD. The objective lens 9 comprises a flange portion 9A extending perpendicularly to the optical axis. The objective lens 9 can be attached to the optical pickup device 7' accurately by the flange portion 9A. The numerical aperture of the objective lens 9 on the side of an optical disk 10 is made not less than 0.80.

A diverging light beam emitted from the laser diode 8 is transmitted through a polarization beam splitter 11 and passes through a quarter-wave plate 13 to become circularly polarized light, and subsequently, has the light beam diameter regulated by a stop 14 and is made a spot that is passed through the protective layer 10A of the optical disk 10 of a high-density DVD and formed on the information recording surface 10B by the objective lens 9. A reflected beam light modulated by information bit in the information recording surface 10B is transmitted again through the objective lens 9, the stop 14 and the quarter-wave plate 13, and subsequently, is reflected by the polarization beam splitter 11, provided with astigmatic aberration by passing through a cylindrical lens 16 and concave lens 17, and converged on an optical detector 18. Subsequently, it is possible to read information recorded on the optical disk 10 by using an output signal of the optical detector 18.

In the optical pickup device 7', the laser diode 8, objective lens 9, polarization beam splitter 11, quarter-wave plate 13, cylindrical lens 16, concave lens 17 and optical detector 18 are modularized onto a substrate. In tracking control, these are monolithically driven by the actuator 19.

Next, six Examples preferred for the above-described embodiments will be proposed. Examples 1 to 6 are objective lenses applied to an optical pickup device for a high-density DVD in which the wavelength used for recording/reproducing information is 405 nm and the thickness of the protective layer is 0.1 mm. Example 1 is a plastic single lens where the generation amounts of thermal aberration and longitudinal chromatic aberration are suppressed low by setting the focal length so as to satisfy the formula (2), and both of Examples 2 and 3 are plastic single lenses where the thermal aberration is corrected by the effect of the ring-shaped phase structure formed on the first surface (the optical surface on the side of the light source). Example 4 is a plastic single lens of the finite conjugate type where the generation amounts of thermal aberration and longitudinal chromatic aberration are suppressed low by setting the focal length so as to satisfy the formula (6A), and both of Examples 5 and 6 are plastic single lenses of the finite conjugate type where the thermal aberration is corrected by the effect of the ring-shaped phase structure formed on the first surface (the optical surface on the side of the light source).

Table 4 shows lens data of the objective lens of Example 1, Table 5 shows lens data of the objective lens of Example 2 and Table 6 shows lens data of the objective lens of Example 3. In the lens data of Tables 4, 5 and 6, r (mm) denotes a curvature radius, d (mm) denotes a surface distance, N405 denotes a refractive index at a wavelength of 405 nm and νd denotes an Abbe number at the d-line.

TABLE 4

| Surface No. | r(mm) | d(mm) | N405 | νd | Remarks |
|---|---|---|---|---|---|
| 0 | | ∞ | | | Light source |
| 1 | 0.3353 | 0.6600 | 1.56013 | 56.7 | Objective lens |
| 2 | −0.3615 | 0.0762 | | | |
| 3 | ∞ | 0.1000 | 1.61950 | 30.0 | Protective layer |
| 4 | ∞ | | | | |

| Aspherical surface coefficients | | |
|---|---|---|
| | 1st surface | 2nd surface |
| κ | −6.9542E−01 | −1.7907E+01 |
| A4 | 7.9891E−01 | 1.5728E+01 |
| A6 | 1.3935E+00 | −3.5161E+02 |
| A8 | 3.3472E+01 | 3.4150E+03 |
| A10 | −7.8778E+01 | −1.3187E+04 |
| A12 | −7.8324E+02 | −5.2600E+02 |
| A14 | 6.6992E+03 | |
| A16 | 3.4753E+04 | |
| A18 | −1.9498E+05 | |
| A20 | −5.8872E+05 | |

TABLE 5

| Surface No. | r(mm) | d(mm) | N405 | νd | Remarks |
|---|---|---|---|---|---|
| 0 | | ∞ | | | Light source |
| 1 | 0.6157 | 1.1400 | 1.56013 | 56.7 | Objective |

TABLE 5-continued

| | | | | | |
|---|---|---|---|---|---|
| 2 | −0.9615 | 0.2018 | | | lens |
| 3 | ∞ | 0.1000 | 1.61950 | 30.0 | Protective |
| 4 | ∞ | | | | layer |

Aspherical surface coefficients

| | 1st surface | 2nd surface |
|---|---|---|
| κ | −6.3213E−01 | −4.7996E+01 |
| A4 | 5.0716E−02 | 1.7646E+00 |
| A6 | 5.2621E−02 | −9.5272E+00 |
| A8 | 5.2319E−01 | 1.8626E+01 |
| A10 | −7.1277E−01 | 1.2599E+00 |
| A12 | −9.9374E−01 | −4.0506E+01 |
| A14 | 3.4591E+00 | |
| A16 | −2.1262E+00 | |
| A18 | 3.3120E+00 | |
| A20 | −8.7979E+00 | |

Diffraction surface coefficients

| | 1st surface |
|---|---|
| b2 | −2.4634E−02 |
| b4 | −5.1397E−02 |
| b6 | 5.7231E−02 |
| b8 | −9.6553E−02 |
| b10 | −4.4043E−02 |

TABLE 7

| | thermal aberration(+30° C.) | Mode hopping(+1 nm) |
|---|---|---|
| Example 1 | 0.020 λrms | 0.028 λrms |

In Table 7, for calculating the thermal aberration, the change rate of the refractive index accompanying temperature rise of the plastic lens is $-9.0 \times 10^{-5}$ and the change rate of the wavelength of incident light accompanying temperature rise is +0.05 nm/° C. For calculating the spherical aberration in generation of mode hopping, the variation of the wavelength of a blue-violet laser diode owing to the mode hopping is assumed +1 nm and the focal position of the objective lens is fixed at the best image surface position of 405 nm.

Figure 5:
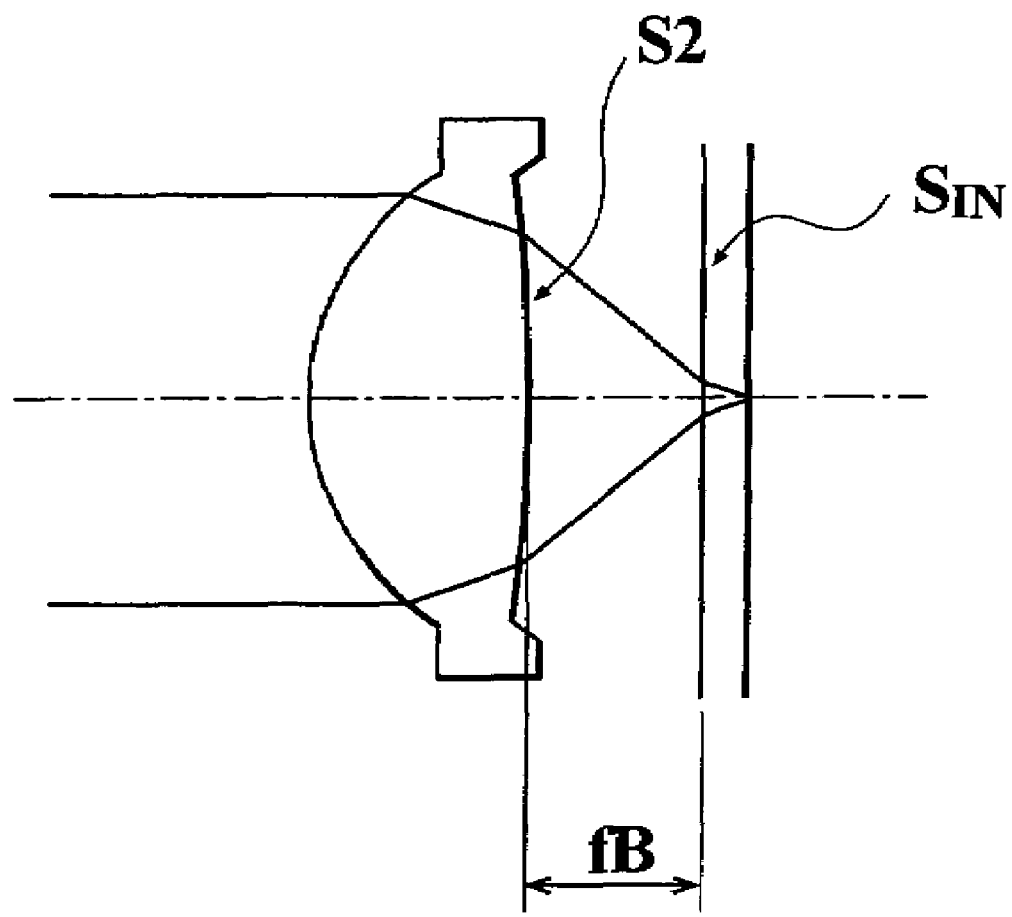
FIG. 5 is a view for illustrating a back focal length fB.

As for the objective lens of Example 1, a value of $\Delta W$ (formula (3)) is $\Delta W=0.019$ λrms because of $W(\lambda_0, T_0)=0.001$ λrms ($\lambda_0=405$ nm and $T_0=25°$ C.) and $W(\lambda_0, T_1)=0.020$ λrms ($\lambda_0=405$ nm and $T_1=55°$ C.). A value of $\Delta fB$ (formula (5)) is $\Delta fB=0.0004$ mm because of $fB(\lambda_0, T_0)=0.0762$ mm ($\lambda_0=405$ nm and $T_0=25°$ C.) and $fB(\lambda_1, T_0)=0.0766$ mm ($\lambda_1=410$ nm and $T_0=25°$ C.). As shown in FIG. 5, a back focal length fB in the present description indicates the distance along the optical axis between the optical surface S2 of the objective lens on the

TABLE 6

| Surface No. | r(mm) | d(mm) | N405 | νd | Remarks |
|---|---|---|---|---|---|
| 0 | | ∞ | | | Light source |
| 1 | See below | See below | 1.56013 | 56.7 | Objective |
| 2 | −0.5177 | 0.1190 | | | lens |
| 3 | ∞ | 0.1000 | 1.61950 | 30.0 | Protective |
| 4 | ∞ | | | | layer |

Aspherical surface coefficients

1st surface
Ring surface No.

| | 1 | 2 | 3 | 4 | 5 | 6 | 2nd surface |
|---|---|---|---|---|---|---|---|
| Starting height (mm) | 0.000 | 0.180 | 0.250 | 0.320 | 0.468 | 0.490 | |
| End height (mm) | 0.180 | 0.250 | 0.320 | 0.468 | 0.490 | 0.500 | |
| r(mm) | 0.4098 | 0.4091 | 0.4088 | 0.4085 | 0.4091 | 0.4093 | |
| d(mm) | 0.790000 | 0.791446 | 0.792892 | 0.794338 | 0.792892 | 0.791446 | |
| κ | −6.8225E−01 | −6.8654E−01 | −6.8173E−01 | −6.4004E−01 | −6.8027E−01 | −6.8136E−01 | −2.7583E+01 |
| A4 | 4.7569E−01 | 4.6142E−01 | 4.7673E−01 | 4.3957E−01 | 4.8637E−01 | 4.8269E−01 | 5.6751E+00 |
| A6 | −7.5261E−02 | 3.0402E−01 | 4.1806E−02 | −7.5127E−01 | −5.4146E−02 | −6.5495E−02 | −6.8184E+01 |
| A8 | 9.7904E+00 | 8.5608E+00 | 8.5753E+00 | 1.2831E+01 | 9.7795E+00 | 9.7619E+00 | 3.5710E+02 |
| A10 | −2.9021E+00 | −8.6205E+00 | 1.3381E+00 | −1.0574E+01 | −3.3573E+00 | −3.2629E+00 | −7.5179E+02 |
| A12 | −1.3130E+02 | −1.3130E+02 | −1.3130E+02 | −1.3130E+02 | −1.3131E+02 | −1.3130E+02 | −4.5183E+01 |
| A14 | 2.4202E+02 | 2.4202E+02 | 2.4202E+02 | 2.4202E+02 | 2.4202E+02 | 2.4201E+02 | |
| A16 | 2.2763E+03 | 2.2763E+03 | 2.2763E+03 | 2.2763E+03 | 2.2763E+03 | 2.2763E+03 | |
| A18 | −2.2834E+03 | −2.2834E+03 | −2.2834E+03 | −2.2834E+03 | −2.2834E+03 | −2.2834E+03 | |
| A20 | −1.8263E+04 | −1.8263E+04 | −1.8263E+04 | −1.8263E+04 | −1.8263E+04 | −1.8263E+04 | |

Example 1 is a plastic single lens having an incident light beam diameter of 0.8 mm, a focal length f=0.47 mm, an NA of 0.85, a design wavelength of 405 nm, a design temperature of 25° C. Because the focal length is set so as to satisfy the formula (2), it is a plastic single lens having a high NA and yet a lens where both spherical aberrations in generation of thermal aberration and mode hopping are good as shown in Table 7.

Example 2 is a plastic single lens having an incident light beam diameter of 1.5 mm, focal length f=0.88 mm, an NA of 0.85, a design wavelength of 405 nm, a design temperature of 25° C., and a suitable objective lens as the objective lens 1 in the above-described embodiment. As shown in Table 8, 80 side of the optical information recording medium and a light beam incident surface $S_{IN}$ of the optical information recording medium.

lengths of ring-shaped phase structure as a diffraction structure whose boundaries comprise a step Δ of about 0.7 μm to 1.2 μm in the optical axis direction are formed within the effective diameter on the 1st surface of the objective lens of Example 2. When laser light from the blue-violet laser diode is made incident to the ring-shaped phase structure, the 1st order diffracted light is generated so as to have the maximum diffracted light quantity (i.e. the ring-shaped phase structure is optimized at a wavelength of 405 nm and a diffraction order of 1). By the diffraction effect of the ring-shaped phase structure, thermal aberration is well corrected.

TABLE 8

| Ring surface No. | Starting height (mm) | End height (mm) |
|---|---|---|
| 1 | 0.000 | 0.126 |
| 2 | 0.126 | 0.176 |
| 3 | 0.176 | 0.213 |
| 4 | 0.213 | 0.243 |
| 5 | 0.243 | 0.269 |
| 6 | 0.269 | 0.291 |
| 7 | 0.291 | 0.312 |
| 8 | 0.312 | 0.330 |
| 9 | 0.330 | 0.347 |
| 10 | 0.347 | 0.363 |
| 11 | 0.363 | 0.378 |
| 12 | 0.378 | 0.392 |
| 13 | 0.392 | 0.406 |
| 14 | 0.406 | 0.418 |
| 15 | 0.418 | 0.430 |
| 16 | 0.430 | 0.441 |
| 17 | 0.441 | 0.452 |
| 18 | 0.452 | 0.463 |
| 19 | 0.463 | 0.473 |
| 20 | 0.473 | 0.482 |
| 21 | 0.482 | 0.491 |
| 22 | 0.491 | 0.500 |
| 23 | 0.500 | 0.509 |
| 24 | 0.509 | 0.517 |
| 25 | 0.517 | 0.525 |
| 26 | 0.525 | 0.533 |
| 27 | 0.533 | 0.540 |
| 28 | 0.540 | 0.547 |
| 29 | 0.547 | 0.554 |
| 30 | 0.554 | 0.561 |
| 31 | 0.561 | 0.568 |
| 32 | 0.568 | 0.574 |
| 33 | 0.574 | 0.580 |
| 34 | 0.580 | 0.586 |
| 35 | 0.586 | 0.592 |
| 36 | 0.592 | 0.598 |
| 37 | 0.598 | 0.603 |
| 38 | 0.603 | 0.609 |
| 39 | 0.609 | 0.614 |
| 40 | 0.614 | 0.619 |
| 41 | 0.619 | 0.624 |
| 42 | 0.624 | 0.629 |
| 43 | 0.629 | 0.633 |
| 44 | 0.633 | 0.638 |
| 45 | 0.638 | 0.642 |
| 46 | 0.642 | 0.647 |
| 47 | 0.647 | 0.651 |
| 48 | 0.651 | 0.655 |
| 49 | 0.655 | 0.659 |
| 50 | 0.659 | 0.663 |
| 51 | 0.663 | 0.667 |
| 52 | 0.667 | 0.671 |
| 53 | 0.671 | 0.675 |
| 54 | 0.675 | 0.678 |
| 55 | 0.678 | 0.682 |
| 56 | 0.682 | 0.685 |
| 57 | 0.685 | 0.689 |
| 58 | 0.689 | 0.692 |
| 59 | 0.692 | 0.695 |
| 60 | 0.695 | 0.699 |
| 61 | 0.699 | 0.702 |
| 62 | 0.702 | 0.705 |

TABLE 8-continued

| Ring surface No. | Starting height (mm) | End height (mm) |
|---|---|---|
| 63 | 0.705 | 0.708 |
| 64 | 0.708 | 0.711 |
| 65 | 0.711 | 0.714 |
| 66 | 0.714 | 0.717 |
| 67 | 0.717 | 0.719 |
| 68 | 0.719 | 0.722 |
| 69 | 0.722 | 0.725 |
| 70 | 0.725 | 0.727 |
| 71 | 0.727 | 0.730 |
| 72 | 0.730 | 0.733 |
| 73 | 0.733 | 0.735 |
| 74 | 0.735 | 0.738 |
| 75 | 0.738 | 0.740 |
| 76 | 0.740 | 0.743 |
| 77 | 0.743 | 0.745 |
| 78 | 0.745 | 0.747 |
| 79 | 0.747 | 0.750 |
| 80 | 0.750 | 0.752 |

As for the objective lens of Example 2, a value of $\Delta W1$ (formula (9)) is $\Delta w1=0.019$ λrms because of $W(\lambda_0, T_0)=0.001$ λrms ($\lambda_0=405$ nm and $T_0=25°$ C.) and $W(\lambda_2, T_1)=0.020$ λrms ($\lambda_2=406.5$ nm and $T_1=55°$ C.). A value of $\Delta W2$ (formula (10)) is $\Delta W2=0.021$ λrms because of $W(\lambda_0, T_0)=0.001$ λrms ($\lambda_0=405$ nm and $T_0=25°$ C.) and $W(\lambda_1, T_0)=0.022$ λrms ($\lambda_1=410$ nm and $T_0=25°$ C.). A value of the formula (8A) in Example 2 is −42.

Example 3 is a plastic single lens having an incident light beam diameter of 1.0 mm, a focal length f=0.59 mm, an NA of 0.85, a design wavelength of 405 nm, a design temperature of 25° C., and a suitable objective lens as the objective lens 4 in the above-described embodiment. As shown in Table 6, 6 lengths of ring-shaped phase structure as a diffraction structure whose boundaries comprise a step Δ of about 1.5 μm to 2.3 μm in the optical axis direction are formed within the effective diameter on the 1st surface of the objective lens of Example 3. When laser light from the blue-violet laser diode is made incident to the ring-shaped phase structure, the 1st order diffracted light is generated so as to have the maximum diffracted light quantity (i.e. the ring-shaped phase structure is optimized at a wavelength of 405 nm and a diffraction order of 1). By the effect of the ring-shaped phase structure, thermal aberration is well corrected.

As for the objective lens of Example 3, a value of $\Delta W1$ (formula (9)) is $\Delta W1=0.013$ λrms because of $W(\lambda_0, T_0)=0.002$ λrms ($\lambda_0=405$ nm and $T_0=25°$ C.) and $W(\lambda_2, T_1)=0.015$ λrms ($\lambda_2=406.5$ nm and $T_1=55°$ C.). A value of $\Delta W2$ (formula (10)) is $\Delta W2=0.013$ λrms because of $W(\lambda_0, T_0)=0.002$ λrms ($\lambda_0=405$ nm and $T_0=25°$ C.) and $W(\lambda_1, T_1)=0.015$ λrms ($\lambda_1=410$ nm and $T_0=25°$ C.). As for values of the formula (8B) in Example 3, the 5th ring surface is $m_j=3$ and the 6th ring surface is $m_j=3$.

Both objective lenses of Examples 2 and 3 have a focal length set so as to satisfy the formula (8) in order to reduce the correction amount of thermal aberration, and additionally, have a configuration where the correction of thermal aberration and the generation amount of chromatic spherical aberration are matched so as to respectively satisfy the formulas (11) to (13). Accordingly, they are plastic single lenses with a high NA and yet a lens having good thermal aberration and chromatic spherical aberration as shown in Table 9.

TABLE 9

|  | thermal aberration (+30° C.) | chromatic spherical aberration (+5 nm) |
|---|---|---|
| Example 2 | 0.020 λrms | 0.022 λrms |
| Example 3 | 0.015 λrms | 0.015 λrms |

In Table 9, for calculating the thermal aberration, the change rate of the refractive index accompanying temperature rise of the plastic lens is $-9.0 \times 10^{-5}$ and the change rate of the wavelength of incident light accompanying temperature rise is +0.05 nm/° C.

Table 11 shows lens data of the objective lens of Example 5 and Table 15 shows lens data of the objective lens of Example 6. In the lens data of Tables 10, 11 and 15, r (mm) denotes a curvature radius, d (mm) denotes a surface distance, N405 denotes a refractive index at a wavelength of 405 nm and vd denotes an Abbe number at the d-line.

TABLE 10

[Example 4]

| Surface No. | r(mm) | d(mm) | N405 | vd | Remarks |
|---|---|---|---|---|---|
| 0 |  | 3.7500 |  |  | Light source |
| 1 | 0.2136 | 0.3750 | 1.56013 | 56.7 | Objective lens |
| 2 | -0.2910 | 0.0742 |  |  |  |
| 3 | ∞ | 0.1000 | 1.61950 | 30.0 | Protective layer |
| 4 | ∞ |  |  |  |  |

Aspherical surface coefficients

|  | 1st surface | 2nd surface |
|---|---|---|
| κ | -6.5380E-01 | -2.9101E-01 |
| A4 | 5.9438E-01 | -8.1619E+00 |
| A6 | 2.0735E+01 | 3.9794E+01 |
| A8 | -2.1582E+01 | -1.4824E+03 |
| A10 | 2.8863E+03 | 3.2709E+04 |
| A12 | 5.9020E+03 | -4.4513E+05 |
| A14 | -5.2839E+05 | 3.4193E+06 |
| A16 | -1.7610E+06 | -1.1349E+07 |
| A18 | 4.3204E+07 |  |
| A20 | -3.1642E+08 |  |

TABLE 11

[Example 5]

| Surface No. | r(mm) | d(mm) | N405 | vd | Remarks |
|---|---|---|---|---|---|
| 0 |  | 5.0000 |  |  | Light source |
| 1 | 0.2769 | 0.5240 | 1.56013 | 56.7 | Objective lens |
| 2 | -0.3763 | 0.1000 |  |  |  |
| 3 | ∞ | 0.1000 | 1.61950 | 30.0 | Protective layer |
| 4 | ∞ |  |  |  |  |

Aspherical surface coefficients

|  | 1st surface | 2nd surface |
|---|---|---|
| κ | -6.8145E-01 | -9.4697E+00 |
| A4 | -3.0262E-02 | 1.9844E+01 |
| A6 | 1.1148E+00 | -4.5104E+02 |
| A8 | -1.5150E+01 | 6.0959E+03 |
| A10 | 3.1738E+02 | -5.2115E+04 |
| A12 | 2.4517E+02 | 2.5579E+05 |
| A14 | -1.9895E+04 | -5.5335E+05 |
| A16 | -2.8487E+03 |  |
| A18 | 9.0622E+05 |  |
| A20 | -4.9449E+06 |  |

Diffraction surface coefficients

|  | 1st surface |
|---|---|
| b4 | -2.6238E-01 |
| b6 | -1.9998E+00 |

TABLE 15

|  | thermal aberration (+30° C.) | chromatic spherical aberration (+5 nm) |
|---|---|---|
| Example 5 | 0.018 λrms | 0.019 λrms |

Example 4 is a plastic single lens having a focal length of 0.30 mm, an NA of 0.85, a design wavelength of 405 nm, an image formation magnification of -0.084 and a design temperature of 25° C. In case of disposing a stop regulating a light beam at the surface top position of the 1st surface in the objective lens of Example 4, its stop diameter becomes 0.532 mm. Because the focal length is set so as to satisfy the formula (6A), it is a plastic single lens of finite conjugate type with a high NA and yet a lens where both spherical aberrations in generation of thermal aberration and mode hopping are good as shown in Table 12.

TABLE 12

| Surface No. | r(mm) | d(mm) | N405 | vd | Remarks |
|---|---|---|---|---|---|
| 0 |  | 5.000 |  |  | Light source |
| 1 | See below | See below | 1.56013 | 56.7 | Objective lens |
| 2 | -0.3424 | 0.0956 |  |  |  |
| 3 | ∞ | 0.1000 | 1.61950 | 30.0 | Protective layer |
| 4 | ∞ |  |  |  |  |

Aspherical surface coefficients

1st surface
Ring surface NO.

|  | 1 | 2 | 3 | 4 | 5 | 6 | 7 | 2nd surface |
|---|---|---|---|---|---|---|---|---|
| Starting height (mm) | 0.000 | 0.100 | 0.145 | 0.180 | 0.215 | 0.315 | 0.338 |  |
| End height (mm) | 0.100 | 0.145 | 0.180 | 0.215 | 0.315 | 0.338 | 0.373 |  |

TABLE 12-continued

| r(mm) | 0.2812 | 0.2808 | 0.2806 | 0.2804 | 0.2798 | 0.2817 | 0.2796 | |
|---|---|---|---|---|---|---|---|---|
| d(mm) | 0.540000 | 0.541446 | 0.542912 | 0.544382 | 0.545818 | 0.543517 | 0.540000 | |
| κ | −6.5614E−01 | −6.7753E−01 | −6.9605E−01 | −6.7324E−01 | −6.6181E−01 | −6.5835E−01 | −6.7741E−01 | −9.1512E+00 |
| A4 | 2.2680E−01 | 3.4429E−01 | 5.1719E−01 | 3.7786E−01 | 2.8692E−01 | 2.6051E−01 | 6.6914E−02 | 1.9167E+01 |
| A6 | 4.4574E+00 | 4.4574E+00 | 4.4574E+00 | 4.4574E+00 | 4.4574E+00 | 4.6743E+00 | 6.1404E+00 | −4.5257E+02 |
| A8 | −1.4000E+01 | −1.4000E+01 | −1.4000E+01 | −1.4000E+01 | −1.4000E+01 | −1.4000E+01 | −1.4000E+01 | 6.1555E+03 |
| A10 | 3.2216E+02 | 3.2216E+02 | 3.2216E+02 | 3.2216E+02 | 3.2216E+02 | 3.2216E+02 | 3.2216E+02 | −5.1764E+04 |
| A12 | 5.1481E+02 | 5.1481E+02 | 5.1481E+02 | 5.1481E+02 | 5.1481E+02 | 5.1481E+02 | 5.1481E+02 | 2.4522E+05 |
| A14 | −1.9311E+04 | −1.9311E+04 | −1.9311E+04 | −1.9311E+04 | −1.9311E+04 | −1.9311E+04 | −1.9311E+04 | −5.0382E+05 |
| A16 | −1.2688E+04 | −1.2688E+04 | −1.2688E+04 | −1.2688E+04 | −1.2688E+04 | −1.2688E+04 | −1.2688E+04 | |
| A18 | 8.2257E+05 | 8.2257E+05 | 8.2257E+05 | 8.2257E+05 | 8.2257E+05 | 8.2257E+05 | 8.2257E+05 | |
| A20 | −5.0807E+06 | −5.0807E+06 | −5.0807E+06 | −5.0807E+06 | −5.0807E+06 | −5.0807E+06 | −5.0807E+06 | |

In Table 12, for calculating the thermal aberration, the change rate of the refractive index accompanying temperature rise of the plastic lens is $-9.0 \times 10^{-5}$ and the change rate of the wavelength of incident light accompanying temperature rise is +0.05 nm/° C. For calculating the spherical aberration in generation of mode hopping, the variation of the wavelength of a blue-violet laser diode owing to the mode hopping is assumed +1 nm and the focal position of the objective lens is fixed at the best image surface position of 405 nm.

As for the objective lens of Example 4, a value of $\Delta W$ (formula (3)) is $\Delta W=0.028$ λrms because of $W(\lambda_0, T_0)=0.000$ λrms ($\lambda_0=405$ nm and $T_0=25°$ C.) and $W(\lambda_0, T_1)=0.028$ λrms ($\lambda_0=405$ nm and $T_1=55°$ C.). A value of $\Delta fB$ (formula (5)) is $\Delta fB=0.0004$ mm because of $fB(\lambda_0, T_0)=0.0742$ mm ($\lambda_0=405$ nm and $T_0=25°$ C.) and $fB(\lambda_1, T_0)=0.0746$ mm ($\lambda_1=410$ nm and $T_0=25°$ C.).

Example 5 is a plastic single lens having a focal length f=0.40 mm, an NA of 0.85, a design wavelength of 405 nm, an image formation magnification of −0.083 and a design temperature of 25° C. and a suitable objective lens as the objective lens 1 in the above-described embodiment. In case of disposing a stop regulating a light beam at the surface top position of the 1st surface in the objective lens of Example 5, its stop diameter becomes 0.708 mm. As shown in Table 13, 27 lengths of ring-shaped phase structure as a diffraction structure whose boundaries comprise a step Δ of about 0.7 μm to 1.1 μm in the optical axis direction are formed within the effective diameter on the 1st surface of the objective lens of Example 5. When laser light from the blue-violet laser diode is made incident to the ring-shaped phase structure, the 1st order diffracted light is generated so as to have the maximum diffracted light quantity (i.e. the ring-shaped phase structure is optimized at a wavelength of 405 nm and a diffraction order of 1 (the diffraction efficiency is the highest). By the diffraction effect of the ring-shaped phase structure, thermal aberration is well corrected.

TABLE 13

| | thermal aberration (+30° C.) | Mode hopping(+1 nm) |
|---|---|---|
| Example 4 | 0.028 λrms | 0.024 λrms |

As for the objective lens of Example 5, a value of ΔW1 (formula (9)) is $\Delta W1=0.018$ λrms because of $W(\lambda_0, T_0)=0.000$ λrms ($\lambda_0=405$ nm and $T_0=25°$ C.) and $W(\lambda_2, T_1)=0.018$ λrms ($\lambda_2=406.5$ nm and $T_1=55°$ C.). A value of ΔW2 (formula (10)) is $\Delta W2=0.019$ λrms because of $W(\lambda_0, T_0)=0.000$ λrms ($\lambda_0=405$ nm and $T_0=25°$ C.) and $W(\lambda_1, T_0)=0.019$ λrms ($\lambda_1=410$ nm and $T_0=25°$ C.).

The objective lens of Example 5 has a focal length set so as to satisfy the formula (13A) in order to reduce the correction amount of thermal aberration, and additionally, have a configuration where the correction of thermal aberration and the generation amount of chromatic spherical aberration are matched so as to respectively satisfy the formulas (9) to (11). Accordingly, it is a plastic single lens having a high NA of the finite conjugate type and yet a lens having good thermal aberration and chromatic spherical aberration as shown in Table 14.

TABLE 14

| Ring surface No. | Starting height (mm) | End height (mm) |
|---|---|---|
| 1 | 0.000 | 0.187 |
| 2 | 0.187 | 0.218 |
| 3 | 0.218 | 0.238 |
| 4 | 0.238 | 0.254 |
| 5 | 0.254 | 0.266 |
| 6 | 0.266 | 0.277 |
| 7 | 0.277 | 0.286 |
| 8 | 0.286 | 0.294 |
| 9 | 0.294 | 0.301 |
| 10 | 0.301 | 0.308 |
| 11 | 0.308 | 0.314 |
| 12 | 0.314 | 0.319 |
| 13 | 0.319 | 0.325 |
| 14 | 0.325 | 0.330 |
| 15 | 0.330 | 0.334 |
| 16 | 0.334 | 0.339 |
| 17 | 0.339 | 0.343 |
| 18 | 0.343 | 0.347 |
| 19 | 0.347 | 0.351 |
| 20 | 0.351 | 0.354 |
| 21 | 0.354 | 0.358 |
| 22 | 0.358 | 0.361 |
| 23 | 0.361 | 0.364 |
| 24 | 0.364 | 0.368 |
| 25 | 0.368 | 0.371 |
| 26 | 0.371 | 0.373 |
| 27 | 0.373 | 0.376 |

In Table 14, for calculating the thermal aberration, the change rate of the refractive index accompanying temperature rise of the plastic lens is $-9.0 \times 10^{-5}$ and the change rate of the wavelength of incident light accompanying temperature rise is +0.05 nm/° C. A value of the formula (8A) in Example 5 is −45.

Example 6 is a plastic single lens having a focal length f=0.40 mm, an NA of 0.85, a design wavelength of 405 nm, an image formation magnification of −0.083 and a design temperature of 25° C. and a suitable objective lens as the objective lens 4 in the above-described embodiment. In case of disposing a stop regulating a light beam at the surface top position of the 1st surface in the objective lens of Example 6, its stop diameter becomes 0.702 mm. As shown in Table 15, 7 lengths of ring-shaped phase structure as a diffraction structure whose boundaries comprise a step Δ of about 1.5 μm to 4.0 μm in the optical axis direction are formed within the effective diameter on the 1st surface of the objective lens of Example 6. By the diffraction effect of the ring-shaped phase structure, thermal aberration is well corrected.

As for the objective lens of Example 6, a value of ΔW1 (formula (9)) is ΔW1=0.018 λrms because of W(λ0, T0)=0.002 λrms (λ0=405 nm and T0=25° C.) and W(λ2, T$_1$)=0.020 λrms (λ2=406.5 nm and T1=55° C.). A value of ΔW2 (formula (10)) is ΔW2=0.030 λrms because of W(λ0, T0)=0.002 λrms (λ0=405 nm and T0=25° C.) and W(λ1, T$_1$)=0.032 λrms (λ1=410 nm and T0=25° C.). As for values of the formula (8B) in Example 6, the 6th ring surface is m$_j$=5 and the 7th ring surface is m$_j$=7.

The objective lens of Example 6 has a focal length set so as to satisfy the formula (6A) in order to reduce the correction amount of thermal aberration, and additionally, have a configuration where the correction of thermal aberration and the generation amount of chromatic spherical aberration are matched so as to respectively satisfy the formulas (11) to (13). Accordingly, it is a plastic single lens having a high NA of the finite conjugate type and yet a lens having good thermal aberration and chromatic spherical aberration as shown in Table 16.

TABLE 16

|  | Thermal aberration (+30° C.) | Chromatic spherical aberration (+5 nm) |
| --- | --- | --- |
| Example 6 | 0.020 λrms | 0.032 λrms |

In Table 16, for calculating the thermal aberration, the change rate of the refractive index accompanying temperature rise of the plastic lens is $-9.0 \times 10^{-5}$ and the change rate of the wavelength of incident light accompanying temperature rise is +0.05 nm/° C.

A value of the above-described formula (16) in each example, which is $\{(X1-X2)\cdot(N-1)/(NA\cdot f\cdot\sqrt{(1+|m|)})\}$, is as follows:

Example 1: 0.471
Example 2: 0.454
Example 3: 0.490
Example 4: 0.576
Example 5: 0.538
Example 6: 0.558

INDUSTRIAL APPLICABILITY

According to the present invention, it is possible to provide a plastic single lens applicable to an objective lens of an optical pickup device using a plastic single lens having a high NA, in which an available temperature range is sufficiently broad and converging ability due to mode hopping of a light source is degraded scarcely, and thereby it is possible to provide an optical pickup device and optical information recording/reproducing apparatus having high performance.

The invention claimed is:

1. An objective lens used for an optical pickup device, the optical pickup device comprising:
   a light source; and
   a converging optical system including the objective lens for converging a light beam emitted from the light source to an information recording surface of an optical information recording medium,
   wherein the optical pickup device is capable of recording and/or reproducing information by converging the light beam emitted from the light source to the information recording surface of the optical information recording medium with the converging optical system, and
   wherein the objective lens is a plastic single lens and satisfies following formulas:

$$NA \geq 0.8 \tag{1}$$

$$1.0 > f > 0.2 \tag{2}$$

$$0.8 < d/f < 1.8 \tag{14}$$

$$500 \geq \lambda_0 \geq 350 \tag{15}$$

$$0.40 \leq (X1-X2)\cdot(N-1)/(NA\cdot f\cdot\sqrt{(1+|m|)}) \leq 0.63 \tag{16}$$

where NA is an image-side numerical aperture of the objective lens, which is required for recording and/or reproducing information to the optical information recording medium, f(mm) is a focal length of the objective lens, $\lambda_0$ (nm) is a design wavelength of the objective lens, d (mm) is a lens thickness in an optical axis of the objective lens, X1 (mm) is a distance in an optical axis direction between a plane that is perpendicular to an optical axis and tangent to a top of an optical surface on a light source side and an optical surface on the light source side in a most peripheral portion of an effective diameter (position of the NA on a surface on the light source side to which a marginal light beam is incident), X2 (mm) is a distance in an optical axis direction between a plane that is perpendicular to an optical axis and tangent to a top of an optical surface on an optical information recording medium side and an optical surface on the optical information recording medium side in a most peripheral portion of an effective diameter (position of the NA on a surface on the optical information recording medium side to which a marginal light beam is incident), N is a refractive index of the objective lens at the design wavelength $\lambda_0$, and m is an image formation magnification of the objective lens, wherein X1 is a plus in a case of measuring X1 in a direction of the optical information recording medium with reference to the tangent plane, and minus in a case of measuring X1 in a direction of the light source, and wherein X2 is plus in a case of measuring X2 in a direction of the optical information recording medium with reference to the tangent plane and minus in a case of measuring X2 in a direction of the light source.

2. The objective lens for the optical pickup device of claim 1, wherein W($\lambda_0$, T$_0$) is an RMS value of residual aberration of the objective lens when light having a wavelength of $\lambda_0$ (nm), which is a design wavelength thereof, is incident to the objective lens at an environmental temperature, which is a first ambient temperature T$_0$=25° C. and wherein W($\lambda_0$, T$_1$) is an RMS value of residual aberration of the objective lens when light having the wavelength of $\lambda_0$ (nm), which is a design wavelength thereof, is incident to the objective lens at the environmental temperature, which is a second ambient temperature T$_1$=55° C., ΔW defined by $$\Delta W = |W(\lambda_0, T_1) - W(\lambda_0, T_0)| \tag{3}$$

satisfies a following formula:

$$\Delta W < 0.035 \lambda rms \tag{4}$$

3. The objective lens for the optical pickup device of claim 1, wherein the design wavelength $\lambda_0$ of the optical objective lens is not more than 500 nm,
wherein $fB(\lambda_0, T_0)$ is a back focal length of the objective lens when light having a wavelength of $\lambda_0$ (nm) is incident to the objective lens at an environmental temperature, which is a first ambient temperature $\lambda_0=25°$ C. and
wherein $fB(\lambda_1, T_0)$ is a back focal length of the objective lens when light having a wavelength of $\lambda_1$ (nm), which is 5 nm longer than the wavelength of $\lambda_0$, incident to the objective lens at the environmental temperature, which is the first ambient temperature $T_0=25°$ C.,
$\Delta fB$ defined by $$\Delta fB = |fB(\lambda_1, T_0) - fB(\lambda_0, T_0)| \quad (5)$$

satisfies a following formula:

$$\Delta fB < 0.001 \text{ mm} \quad (6).$$

4. The objective lens for the optical pickup device of claim 1, wherein the objective lens is an objective lens of a finite conjugate type for converging a diverging light beam emitted from the light source to the information recording surface of the optical information recording medium and satisfies a following formula:

$$0.8 > f > 0.2 \quad (6A).$$

5. The objective lens for the optical pickup device of claim 4, wherein m satisfies a following formula when m is an image formation magnification of the objective lens:

$$0.2 > |m| > 0.02 \quad (6B).$$

6. An objective lens used for an optical pickup device, the optical pickup device comprising:
a light source; and
a converging optical system including the objective lens for converging a light beam emitted from the light source to an information recording surface of an optical information recording medium,
wherein the optical pickup device is capable of recording and/or reproducing information by converging the light beam emitted from the light source to the information recording surface of the optical information recording medium with the converging optical system,
wherein the objective lens is a plastic single lens that comprises a ring-shaped phase structure on at least one optical surface, the ring-shaped phase structure comprising a plurality of ring surfaces and formed so that adjacent ring surfaces generate a predetermined optical path difference for incident light, and satisfies following formulas:

$$NA \geq 0.8 \quad (7)$$

$$1.3 > f > 0.2 \quad (8)$$

$$0.8 < d/f < 1.8 \quad (14)$$

$$500 \geq \lambda_0 \geq 350 \quad (15)$$

$$0.40 \leq (X1 - X2) \cdot (N-1)/(NA \cdot f \cdot \sqrt{(1+|m|)}) \leq 0.63 \quad (16)$$

where NA is an image-side numerical aperture of the objective lens, which is required for recording and/or reproducing information for the optical information recording medium, f (mm) is a focal length of the objective lens, $\lambda_0$ (nm) is a design wavelength of the objective lens, d(mm) is a lens thickness in an optical axis of the objective lens, X1 (mm) is a distance in an optical axis direction between a plane that is perpendicular to an optical axis and tangent to a top of an optical surface on a light source side and an optical surface on the light source side in a most peripheral portion of an effective diameter (position of the NA on a surface on the light source side to which a marginal light beam is incident), X2 (mm) is a distance in an optical axis direction between a plane that is perpendicular to an optical axis and tangent to a top of an optical surface on an optical information recording medium side and an optical surface on the optical information recording medium side in a most peripheral portion of an effective diameter (position of the NA on a surface on the optical information recording medium side to which a marginal light beam is incident), N is a refractive index of the objective lens at the design wavelength $\lambda_0$, and m is an image formation magnification of the objective lens,
wherein X1 is a plus in a case of measuring X1 in a direction of the optical information recording medium with reference to the tangent plane, and minus in a case of measuring X1 in a direction of the light source, and
wherein X2 is plus in a case of measuring X2 in a direction of the optical information recording medium with reference to the tangent plane and minus in a case of measuring X2 in a direction of the light source.

7. The objective lens for the optical pickup device of claim 6, wherein the ring-shaped phase structure is a diffraction structure having a function for diffracting predetermined incident light, and the objective lens has a spherical aberration characteristic that spherical aberration changes in an under-corrected direction when a wavelength of the incident light changes to a longer wavelength.

8. The objective lens for the optical pickup device of claim 7, wherein an optical path difference added to a wave front transmitted through the diffraction structure is denoted by an optical path difference function $\phi_b$ defined by $$\phi_b = b_2 \cdot h^2 + b_4 \cdot h^4 + b_6 \cdot h^6 + \ldots$$

(wherein $b_2$, $b_4$, $b_6$ ... are 2nd-order, 4th-order, 6th-order ... optical path difference function coefficients, respectively), a following formula is satisfied:

$$-70 < (b_4 \cdot h_{max}^4)/(f \cdot \lambda_0 \cdot 10^{-6} \cdot (NA \cdot (1-m))^4) < -20 \quad (8A)$$

wherein $\lambda_0$ (nm) is a design wavelength of the objective lens, $h_{MAX}$ is an effective diameter maximum height (mm) of the optical surface on which the diffraction structure is formed and m is an image formation magnification of the objective lens.

9. The objective lens for the optical pickup device of claim 6, wherein when a ring surface including an optical axis is called a central ring surface, a ring surface adjacent to an outside of the central ring surface is formed to be displaced in the optical axis direction so as to have a shorter optical path length than the central ring surface, and a ring surface at a maximum effective diameter position is formed to be displaced in the optical axis direction so as to have a longer optical path length than an ring surface adjacent to an inside thereof.

10. The objective lens for the optical pickup device of claim 9, wherein a total of the ring surfaces is from 3 to 20.

11. The objective lens for the optical pickup device of claim 9, wherein when $\Delta_j$ (μm) is a step amount of an arbitrary step of steps in the optical axis direction at a boundary of mutually adjacent ring surfaces in a ring-shaped phase structure formed in a region from a height of 75% to a height of 100% of an effective diameter maximum height of the optical surface on which the ring-shaped phase structure is formed and n is a refractive index of the objective lens at a design wavelength of $\lambda_0$ (nm), $m_j$ represented by $$m_j = INT(X) \tag{8B}$$

(wherein $X = \Delta_j \cdot (n-1)/(\lambda_0 \cdot 10^{-3})$ and INT(X) is an integer obtained by half adjust of X and is an integer not less than 2.

12. The objective lens for the optical pickup device of claim 9, wherein a ring surface at a position of 75% of a maximum effective diameter is formed to be displaced so as to have a shorter optical path length than a ring surface adjacent to an inside thereof and a ring surface adjacent to an outside thereof.

13. The objective lens for the optical pickup device of claim 6, wherein $W(\lambda_0, T_0)$ is an RMS value of residual aberration of the objective lens when light having a wavelength of $\lambda_0$ (nm), which is a design wavelength thereof, is incident to the objective lens at an environmental temperature which is a first ambient temperature $T_0 = 25°$ C., wherein $W(\lambda_1, T_0)$ is an RMS value of residual aberration of the objective lens when light having a wavelength of $\lambda_1$ (nm) which is 5 nm longer than the wavelength of $\lambda_0$, is incident to the objective lens at the environmental temperature, which is the first ambient temperature $T_0 = 25°$ C., and wherein $W(\lambda_2, T_1)$ is an RMS value of residual aberration of the objective lens when light having a wavelength of $\lambda_2$ (nm) is incident to the objective lens at the environmental temperature, which is a second ambient temperature $T_1 = 55°$ C., $\Delta W1$ and $\Delta W2$ defined by $$\Delta W1 = |W(\lambda_2, T_1) - W(\lambda_0, T_0)| \tag{9}$$

$$\Delta W2 = |W(\lambda_1, T_0) - W(\lambda_0, T_0)| \tag{10}$$

satisfy following formulas:

$$\Delta W1 < 0.035 \, \lambda\text{rms} \tag{11}$$

$$\Delta W2 < 0.035 \, \lambda\text{rms} \tag{12}$$

wherein
when $\lambda_0 < 600$ nm, $\lambda_2 = \lambda_0 + 1.5$ (nm), and
when $\lambda_0 \geq 600$ nm, $\lambda_2 = \lambda_0 + 6$ (nm).

14. The objective lens for the optical pickup device of claim 13, wherein the objective lens satisfies a following formula:

$$\sqrt{((\Delta W1)^2 + (\Delta W2)^2)} < 0.05 \, \lambda\text{rms} \tag{13}$$

15. The objective lens for the optical pickup device of claim 6, wherein the objective lens is an objective lens of a finite conjugate type for converging a diverging light beam emitted from the light source on the information recording surface and satisfies a following formula:

$$1.1 > f > 0.2 \tag{13A}$$

16. The objective lens for the optical pickup device of claim 15, satisfying a following formula when m is an image formation magnification of the objective lens:

$$0.2 > |m| > 0.02 \tag{13B}$$

17. An optical pickup device comprising:
a light source; and
a converging optical system including an objective lens for converging a light beam emitted from the light source to an information recording surface of an optical information recording medium,
wherein the optical pickup device is capable of recording and/or reproducing information by converging the light beam emitted from the light source to the information recording surface of the optical information recording medium with the converging optical system,
wherein the objective lens is a plastic single lens and satisfies following formulas:

$$NA \geq 0.8 \tag{1}$$

$$1.0 > f > 0.2 \tag{2}$$

$$500 \geq \lambda_0 \geq 350 \tag{15}$$

where NA is an image-side numerical aperture of the objective lens, which is required for recording and/or reproducing information to the optical information recording medium, f (mm) is a focal length of the objective lens, and $\lambda_0$ (nm) is a design wavelength of the objective lens,
wherein the optical device satisfies the following formulas:

$$0.8 < d/f < 1.8 \tag{14}$$

$$0.40 \leq (X1 - X2) \cdot (N-1)/(NA \cdot f \cdot \sqrt{(1+|m|)}) \leq 0.63 \tag{16}$$

where d (mm) is a lens thickness in an optical axis of the objective lens, X1 (mm) is a distance in an optical axis direction between a plane that is perpendicular to an optical axis and tangent to a top of an optical surface on a light source side and an optical surface on the light source side in a most peripheral portion of an effective diameter (position of the NA on a surface on the light source side to which a marginal light beam is incident), X2 (mm) is a distance in an optical axis direction between a plane that is perpendicular to an optical axis and tangent to a top of an optical surface on an optical information recording medium side and an optical surface on the optical information recording medium side in a most peripheral portion of an effective diameter (position of the NA on a surface on the optical information recording medium side to which a marginal light beam is incident), N is a refractive index of the objective lens at the design wavelength $\lambda_0$, and m is an image formation magnification of the objective lens,
wherein X1 is a plus in a case of measuring X1 in a direction of the optical information recording medium with reference to the tangent plane, and minus in a case of measuring X1 in a direction of the light source, and
wherein X2 is plus in a case of measuring X2 in a direction of the optical information recording medium with reference to the tangent plane and minus in a case of measuring X2 in a direction of the light source.

18. The optical pickup device of claim 17, wherein $W(\lambda_0, T_0)$ is an RMS value of residual aberration of the objective lens when light having a wavelength of $\lambda_0$ (nm), which is a design wavelength thereof, is incident to the objective lens at an environmental temperature, which is a first ambient temperature $T_0 = 25°$ C., and
wherein $W(\lambda_0, T_1)$ is an RMS value of residual aberration of the objective lens when light having the wavelength of $\lambda_0$ (nm), which is a design wavelength thereof, is incident to the objective lens at the environmental temperature, which is a second ambient temperature $T_1 = 55°$ C., $\Delta W$ defined by $$\Delta W = |W(\lambda_0, T_1) - W(\lambda_0, T_0)| \tag{3}$$

satisfies a following formula:

$$\Delta W < 0.035 \, \lambda\text{rms} \tag{4}$$

19. The optical pickup device of claim 17, wherein the design wavelength $\lambda_0$ of the optical objective lens is not more than 500 nm, wherein fB($\lambda_0$, $T_0$) is a back focal length of the objective lens when light having a wavelength of $\lambda_0$ (nm) is incident to the objective lens at an environmental temperature which is a first ambient temperature $T_0$=25° C., and wherein fB($\lambda_1$, $T_0$) is a back focal length of the objective lens when light having a wavelength of $\lambda_1$ (nm), which is 5 nm longer than the wavelength of $\lambda_0$, is incident to the objective lens at the environmental temperature, which is the first ambient temperature $T_0$=25° C., $\Delta$fB defined by $$\Delta fB = |fB(\lambda_1, T_0) - fB(\lambda_0, T_0)| \quad (5)$$

satisfies a following formula:

$$\Delta fB < 0.001 \text{ mm} \quad (6).$$

20. The optical pickup device of claim 17, wherein the objective lens is an objective lens of a finite conjugate type for converging a diverging light beam emitted from the light source to the information recording surface of the optical information recording medium and satisfies a following formula:

$$0.8 > f > 0.2 \quad (6A).$$

21. The optical pickup device of claim 20, wherein m satisfies a following formula when m is an image formation magnification of the objective lens:

$$0.2 > |m| > 0.02 \quad (6B).$$

22. The optical pickup device of claim 20, wherein the objective lens and the light source are united by an actuator at least to be driven for tracking.

23. An optical pickup device comprising:
a light source; and
a converging optical system including an objective lens for converging a light beam emitted from the light source to an information recording surface of an optical information recording medium,
wherein the optical pickup device is capable of recording and/or reproducing information by converging the light beam emitted from the light source to the information recording surface of the optical information recording medium with the converging optical system,
wherein the objective lens is a plastic single lens that comprises a ring-shaped phase structure on at least one optical surface, the ring-shaped phase structure comprising a plurality of ring surfaces and formed so that adjacent ring surfaces generate a predetermined optical path difference for incident light, and satisfies following formulas:

$$NA \geq 0.8 \quad (7)$$

$$1.3 > f > 0.2 \quad (8)$$

$$500 \geq \lambda_0 \geq 350 \quad (15)$$

where NA is an image-side numerical aperture of the objective lens, which is required for recording and/or reproducing information for the optical information recording medium, f (mm) is a focal length of the objective lens, and $\lambda_0$ (nm) is a design wavelength of the objective lens, wherein the optical device satisfies the following formulas:

$$0.8 < d/f < 1.8 \quad (14)$$

$$0.40 \leq (X1-X2) \cdot (N-1)/(NA \cdot f \sqrt{(1+|m|)}) \leq 0.63 \quad (16)$$

where d (mm) is a lens thickness in an optical axis of the objective lens, X1 (mm) is a distance in an optical axis direction between a plane that is perpendicular to an optical axis and tangent to a top of an optical surface on a light source side and an optical surface on the light source side in a most peripheral portion of an effective diameter (position of the NA on a surface on the light source side to which a marginal light beam is incident), X2 (mm) is a distance in an optical axis direction between a plane that is perpendicular to an optical axis and tangent to a top of an optical surface on an optical information recording medium side and an optical surface on the optical information recording medium side in a most peripheral portion of an effective diameter (position of the NA on a surface on the optical information recording medium side to which a marginal light beam is incident), N is a refractive index of the objective lens at the design wavelength $\lambda_0$, and m is an image formation magnification of the objective lens, wherein X1 is a plus in a case of measuring X1 in a direction of the optical information recording medium with reference to the tangent plane, and minus in a case of measuring X1 in a direction of the light source, and wherein X2 is plus in a case of measuring X2 in a direction of the optical information recording medium with reference to the tangent plane and minus in a case of measuring X2 in a direction of the light source.

24. The optical pickup device of claim 23, wherein the ring-shaped phase structure is a diffraction structure having a function for diffracting predetermined incident light, and the objective lens has a spherical aberration characteristic that spherical aberration chances in an undercorrected direction when a wavelength of the incident light changes to a longer wavelength.

25. The optical pickup device of claim 24, wherein an optical path difference added to a wave front transmitted through the diffraction structure is denoted by an optical path difference function $\phi_b$ defined by $$\phi_b = b_2 \cdot h^2 + b_4 \cdot h^4 + b_6 \cdot h^6 + \ldots$$

(wherein $b_2$, $b_4$, $b_6$ ... are 2nd-order, 4th-order, 6th-order ... optical path difference function coefficients, respectively), a following formula is satisfied:

$$-70 < (b_4 \cdot h_{MAX}^4)/(f \lambda_0 \cdot 10^{-6} \cdot (NA \cdot (1-m))^4) < -20 \quad (8A)$$

wherein $\lambda_0$ (nm) is a design wavelength of the objective lens, $h_{MAX}$ is an effective diameter maximum height (mm) of the optical surface on which the diffraction structure is formed, and m is an image formation magnification of the objective lens.

26. The optical pickup device of claim 23, wherein when a ring surface including an optical axis is called a central ring surface, a ring surface adjacent to an outside of the central ring surface is formed to be displaced in the optical axis direction so as to have a shorter optical path length than the central ring surface, and a ring surface at a maximum effective diameter position is formed to be displaced in the optical axis direction so as to have a longer optical path length than an ring surface adjacent to an inside thereof.

27. The optical pickup device of claim 26, wherein a total of the ring surfaces is from 3 to 20.

28. The optical pickup device of claim 26, wherein when $\Delta_j$ (μm) is a step amount of an arbitrary step of steps in the optical axis direction at a boundary of mutually adjacent ring surfaces in a ring-shaped phase structure formed in a region from a height of 75% to a height of 100% of an effective diameter maximum height of the optical surface on which the ring-shaped phase structure is formed and n is a refractive index of the objective lens at a design wavelength of $\lambda_0$ (nm), $m_j$ represented by $$m_j = INT(X) \tag{8B}$$

(wherein $X = \Delta_j \cdot (n-1)/(\lambda_0 \cdot 10^{-3})$ and $INT(X)$ is an integer obtained by half adjust of X and is an integer not less than 2.

29. The optical pickup device of claim 26, wherein a ring surface at a position of 75% of a maximum effective diameter is formed to be displaced so as to have a shorter optical path length than a ring surface adjacent to an inside thereof and a ring surface adjacent to an outside thereof.

30. The optical pickup device of claim 23, wherein in $W(\lambda_0, T_0)$ is an RMS value of residual aberration of the objective lens when light having a wavelength of $\lambda_0$ (nm), which is a design wavelength thereof, is incident to the objective lens at an environmental temperature, which is a first ambient temperature $T_0 = 25°$ C., wherein $W(\lambda_1, T_0)$ is an RMS value of residual aberration of the objective lens when light having a wavelength of $\lambda_1$ (nm), which is 5 nm longer than the wavelength of $\lambda_0$, is incident to the objective lens at the environmental temperature, which is the first ambient temperature $T_0 = 25°$ C., and wherein $W(\lambda_2, T_1)$ is an RMS value of residual aberration of the objective lens when light having a wavelength of $\lambda_2$ (nm) is incident to the objective lens at the environmental temperature, which is a second ambient temperature $T_1 = 55°$ C., $\Delta W1$ and $\Delta W2$ defined by $$\Delta W1 = |W(\lambda_2, T_1) - W(\lambda_0, T_0)| \tag{9}$$

$$\Delta W2 = |W(\lambda_1, T_0) - W(\lambda_0, T_0)| \tag{10}$$

satisfy following formulas:

$$\Delta W1 < 0.035 \, \lambda \text{rms} \tag{11}$$

$$\Delta W2 < 0.035 \, \lambda \text{rms} \tag{12}$$

wherein
when $\lambda_0 < 600$ nm, $\lambda_2 = \lambda_0 + 1.5$ (nm) and
when $\lambda_0 \geq 600$ nm, $\lambda_2 = \lambda_0 + 6$ (nm).

31. The optical pickup device of claim 30, wherein the optical pickup device satisfies a following formula:

$$\sqrt{((\Delta W1)^2 + (\Delta W2)^2)} < 0.05 \, \lambda \text{rms} \tag{13}.$$

32. The optical pickup device of claim 23, wherein the objective lens is an objective lens of a finite conjugate type for converging a diverging light beam emitted from the light source on the information recording surface and satisfies a following formula:

$$1.1 > f > 0.2 \tag{13A}.$$

33. The optical pickup device of claim 32, the optical pickup device satisfies a following formula:

$$0.2 > |m| > 0.02 \tag{13B}$$

where m is an image formation magnification of the objective lens.

34. The optical pickup device of claim 32, wherein the objective lens and the light source are united by an actuator at least to be driven for tracking.

35. An optical information recording/reproducing apparatus, the apparatus including an optical pickup device that comprises:

a light source; and
a converging optical system including an objective lens for converging a light beam emitted from the light source to an information recording surface of an optical information recording medium,
wherein the apparatus is capable of recording and/or reproducing information by converging the light beam emitted from the light source to the information recording surface of the optical information recording medium with the converging optical system,
wherein the objective lens is a plastic single lens and satisfies following formulas:

$$NA \geq 0.8 \tag{1}$$

$$1.0 > f > 0.2 \tag{2}$$

$$500 \geq \lambda_0 350 \tag{15}$$

where NA is an image-side numerical aperture of the objective lens, which is required for recording and/or reproducing information for the optical information recording medium, f (mm) is a focal length of the objective lens, and $\lambda_0$ (nm) is a design wavelength of the objective lens, wherein the apparatus satisfies the following formulas:

$$0.8 < d/f < 1.8 \tag{14}$$

$$0.40 \leq (X1 - X2) \cdot (N-1)/(NA \cdot f \sqrt{(1+|m|)}) \leq 0.63 \tag{16}$$

where d (mm) is a lens thickness in an optical axis of the objective lens, X1 (mm) is a distance in an optical axis direction between a plane that is perpendicular to an optical axis and tangent to a top of an optical surface on a light source side and an optical surface on the light source side in a most peripheral portion of an effective diameter (position of the NA on a surface on the light source side to which a marginal light beam is incident), X2 (mm) is a distance in an optical axis direction between a plane that is perpendicular to an optical axis and tangent to a top of an optical surface on an optical information recording medium side and an optical surface on the optical information recording medium side in a most peripheral portion of an effective diameter (position of the NA on a surface on the optical information recording medium side to which a marginal light beam is incident), N is a refractive index of the objective lens at the design wavelength $\lambda_0$, and m is an image formation magnification of the objective lens, wherein X1 is a plus in a case of measuring X1 in a direction of the optical information recording medium with reference to the tangent plane, and minus in a case of measuring X1 in a direction of the light source, and wherein X2 is plus in a case of measuring X2 in a direction of the optical information recording medium with reference to the tangent plane and minus in a case of measuring X2 in a direction of the light source.

36. The optical information recording/reproducing apparatus of claim 35, wherein $W(\lambda_0, T_0)$ is an RMS value of residual aberration of the objective lens when light having a wavelength of $\lambda_0$ (nm), which is a design wavelength thereof, is incident to the objective lens at an environmental temperature, which is a first ambient temperature $T_0 = 25°$ C., and wherein $W(\lambda_0, T_1)$ is an RMS value of residual aberration of the objective lens when light having the wavelength of $\lambda_0$ (nm), which is a design wavelength thereof, is incident to the objective lens at the environmental temperature, which is a second ambient temperature $T_1 = 55°$ C., ΔW defined by $$\Delta W = |W(\lambda_0, T_1) - W(\lambda_0, T_0)| \quad (3)$$

satisfies a following formula:

$$\Delta W < 0.035 \, \lambda rms \quad (4)$$

37. The optical information recording/reproducing apparatus of claim 35, wherein the design wavelength $\lambda_0$ of the optical objective lens is not more than 500 nm, wherein $fB(\lambda_0, T_0)$ is a back focal length of the objective lens when light having a wavelength of $\lambda_0$ (nm) is incident to the objective lens at an environmental temperature, which is a first ambient temperature $T_0 = 25°$ C., and wherein $fB(\lambda_1, T_0)$ is a back focal length of the objective lens when light having a wavelength of $\lambda_1$ (nm), which is 5 nm longer than the wavelength of $\lambda_0$, is incident to the objective lens at the environmental temperature, which is the first ambient temperature $T_0 = 25°$ C., $\Delta fB$ defined by $$\Delta fB = |fB(\lambda_1, T_0) - fB(\lambda_0, T_0)| \quad (5)$$

satisfies a following formula:

$$\Delta fB < 0.001 \, mm \quad (6)$$

38. The optical information recording/reproducing apparatus of claim 35, wherein the objective lens is an objective lens of a finite conjugate type for converging a diverging light beam emitted from the light source to the information recording surface of the optical information recording medium and satisfies a following formula:

$$0.8 > f > 0.2 \quad (6A)$$

39. The optical information recording/reproducing apparatus of claim 35, wherein m satisfies a following formula when m is an image formation magnification of the objective lens:

$$0.2 > |m| > 0.02 \quad (6B)$$

40. The optical information recording/reproducing apparatus of claim 38, wherein the objective lens and the light source are united by an actuator at least to be driven for tracking.

41. An optical information recording/reproducing apparatus comprising:

an optical pickup device;

wherein the optical pickup device includes a light source; and a converging optical system including an objective lens for converging a light beam emitted from the light source to an information recording surface of an optical information recording medium, wherein the optical pickup device records and/or reproduces information by converging the light beam emitted from the light source to the information recording surface of the optical information recording medium with the converging optical system, wherein the objective lens is a plastic single lens that comprises a ring-shaped phase structure on at least one optical surface, the ring-shaped phase structure comprising a plurality of ring surfaces and formed so that adjacent ring surfaces generate a predetermined optical path difference for incident light, and satisfies following formulas:

$$NA \geq 0.8 \quad (7)$$

$$1.3 > f > 0.2 \quad (8)$$

$$500 \geq \lambda_0 \geq 350 \quad (15)$$

where NA is an image-side numerical aperture of the objective lens, which is required for recording and/or reproducing information for the optical information recording medium, f (mm) is a focal length of the objective lens, and $\lambda_0$ (nm) is a design wavelength of the objective lens, wherein the apparatus satisfies the following formulas:

$$0.8 < d/f < 1.8 \quad (14)$$

$$0.40 \leq (X1 - X2) \cdot (N-1)/(NA \cdot f \cdot \sqrt{(1+|m|)}) \leq 0.63 \quad (16)$$

where d (mm) is a lens thickness in an optical axis of the objective lens, X1 (mm) is a distance in an optical axis direction between a plane that is perpendicular to an optical axis and tangent to a top of an optical surface on a light source side and an optical surface on the light source side in a most peripheral portion of an effective diameter (position of the NA on a surface on the light source side to which a marginal light beam is incident), X2 (mm) is a distance in an optical axis direction between a plane that is perpendicular to an optical axis and tangent to a top of an optical surface on an optical information recording medium side and an optical surface on the optical information recording medium side in a most peripheral portion of an effective diameter (position of the NA on a surface on the optical information recording medium side to which a marginal light beam is incident), N is a refractive index of the objective lens at the design wavelength $\lambda_0$, and m is an image formation magnification of the objective lens, wherein X1 is a plus in a case of measuring X1 in a direction of the optical information recording medium with reference to the tangent plane, and minus in a case of measuring X1 in a direction of the light source, and wherein X2 is plus in a case of measuring X2 in a direction of the optical information recording medium with reference to the tangent plane and minus in a case of measuring X2 in a direction of the light source.

42. The optical information recording/reproducing apparatus of claim 41, wherein the ring-shaped phase structure is a diffraction structure having a function for diffracting predetermined incident light and the objective lens has a spherical aberration characteristic that spherical aberration changes in an undercorrected direction when a wavelength of the incident light changes to a longer wavelength.

43. The optical information recording/reproducing apparatus of claim 42, wherein an optical path difference added to a wave front transmitted through the diffraction structure is denoted by an optical path difference function $\phi_b$ defined by $$\phi_b = b_2 \cdot h^2 + b_4 \cdot h^4 + b_6 \cdot h^6 + \ldots$$

(wherein $b_2, b_4, b_6 \ldots$ are 2nd-order, 4th-order, 6th-order $\ldots$ optical path difference function coefficients, respectively), a following formula is satisfied:

$$-70 < (b_4 \cdot h_{MAX}^4)/(f \lambda_0 \cdot 10^{-6} \cdot (NA \cdot (1-m))^4) < -20 \quad (8A)$$

wherein $\lambda_0$ (nm) is a design wavelength of the objective lens, $h_{MAX}$ is an effective diameter maximum height (mm) of the optical surface on which the diffraction structure is formed, and m is an image formation magnification of the objective lens.

44. The optical information recording/reproducing apparatus of claim 41, wherein when a ring surface including an optical axis is called a central ring surface, a ring surface adjacent to an outside of the central ring surface is formed to be displaced in the optical axis direction so as to have a shorter optical path length than the central ring surface, and a ring surface at a maximum effective diameter position is formed to be displaced in the optical axis direction so as to have a longer optical path length than an ring surface adjacent to an inside thereof.

45. The optical information recording/reproducing apparatus of claim 44, wherein a total of the ring surfaces is from 3 to 20.

46. The optical information recording/reproducing apparatus of claim 44, wherein when $\lambda_j$ (μm) is a step amount of an arbitrary step of steps in the optical axis direction at a boundary of mutually adjacent ring surfaces in a ring-shaped phase structure formed in a region from a height of 75% to a height of 100% of an effective diameter maximum height of the optical surface on which the ring-shaped phase structure is formed and n is a refractive index of the objective lens at a design wavelength of $\lambda_0$ (nm), $m_j$ represented by $$m_j = INT(X) \tag{8B}$$

(wherein $X = \Delta_j \cdot (n-1)/(\lambda_0 \cdot 10^{-3})$ and INT(X) is an integer obtained by half adjust of X and is an integer not less than 2.

47. The optical information recording/reproducing apparatus of claim 44, wherein a ring surface at a position of 75% of a maximum effective diameter is formed to be displaced so as to have a shorter optical path length than a ring surface adjacent to an inside thereof and a ring surface adjacent to an outside thereof.

48. The optical information recording/reproducing apparatus of claim 41, wherein $W(\lambda_0, T_0)$ is an RMS value of residual aberration of the objective lens when light having a wavelength of $\lambda_0$ (nm), which is a design wavelength thereof, is incident to the objective lens at an environmental temperature, which is a first ambient temperature $T_0 = 25°$ C., wherein $W(\lambda_1, T_0)$ is an RMS value of residual aberration of the objective lens when light having a wavelength of $\lambda_1$ (nm), which is 5 nm longer than the wavelength of $\lambda_0$, is incident to the objective lens at the environmental temperature, which is the first ambient temperature, $T_0 = 25°$ C., and wherein $W(\lambda_2, T_1)$ is an RMS value of residual aberration of the objective lens when light having a wavelength of $\lambda_2$ (nm) is incident to the objective lens at the environmental temperature, which is a second ambient temperature $T_1 = 55°$ C., ΔW1 and ΔW2 defined by $$\Delta W1 = |W(\lambda_2, T_1) - W(\lambda_0, T_0)| \tag{9}$$

$$\Delta W2 = |W(\lambda_1, T_0) - W(\lambda_0, T_0)| \tag{10}$$

satisfy following formulas:

$$\Delta W1 < 0.035 \ \lambda \text{rms} \tag{11}$$

$$\Delta W2 < 0.035 \ \lambda \text{rms} \tag{12}$$

wherein when $\lambda_0 < 600$ nm, $\lambda_2 = \lambda_0 + 1.5$ (nm) and when $\lambda_0 \geq 600$ nm, $\lambda_2 = \lambda_0 + 6$ (nm).

49. The optical information recording/reproducing apparatus of claim 48, wherein the apparatus satisfies a following formula:

$$\sqrt{((\Delta W1)^2 + (\Delta W2)^2)} < 0.05 \ \lambda \text{rms} \tag{13}.$$

50. The optical information recording/reproducing apparatus of claim 41, wherein the objective lens is an objective lens of a finite conjugate type for converging a diverging light beam emitted from the light source on the information recording surface and satisfies a following formula:

$$1.1 > f > 0.2 \tag{13A}$$

51. The optical information recording/reproducing apparatus of claim 50, wherein the apparatus satisfies a following formula when m is an image formation magnification of the objective lens:

$$0.2 > |m| > 0.02 \tag{13B}.$$

52. The optical information recording/reproducing apparatus of claim 50, wherein the objective lens and the light source are united by an actuator at least to be driven for tracking.

* * * * *

UNITED STATES PATENT AND TRADEMARK OFFICE
CERTIFICATE OF CORRECTION

PATENT NO. : 7,606,136 B2  Page 1 of 1
APPLICATION NO. : 10/525660
DATED : October 20, 2009
INVENTOR(S) : Tohru Kimura It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1187 days.

Signed and Sealed this

Fifth Day of October, 2010

David J. Kappos
*Director of the United States Patent and Trademark Office*